(12) United States Patent
Bonefas et al.

(10) Patent No.: US 9,457,971 B2
(45) Date of Patent: Oct. 4, 2016

(54) SYSTEM AND METHOD OF MATERIAL HANDLING USING ONE OR MORE IMAGING DEVICES ON THE TRANSFERRING VEHICLE TO CONTROL THE MATERIAL DISTRIBUTION INTO THE STORAGE PORTION OF THE RECEIVING VEHICLE

(71) Applicants: CARNEGIE MELLON UNIVERSITY, a Pennsylvania Non-Profit Corporation, Pittsburgh, PA (US); Deere & Company, Moline, IL (US)

(72) Inventors: Zachary T. Bonefas, Urbandale, IA (US); Mark M. Chaney, Geneseo, IL (US); Jeremiah K. Johnson, Davenport, IA (US); Aaron J. Bruns, Bettendorf, IA (US); Herman Herman, Gibsonia, PA (US); Carlos Vallespi-Gonzalez, Pittsburgh, PA (US); Jose Gonzalez Mora, Pittsburgh, PA (US)

(73) Assignees: Deere & Company, Moline, IL (US); Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 14/377,383

(22) PCT Filed: Feb. 11, 2013

(86) PCT No.: PCT/US2013/025604
§ 371 (c)(1),
(2) Date: Aug. 7, 2014

(87) PCT Pub. No.: WO2013/184178
PCT Pub. Date: Dec. 12, 2013

(65) Prior Publication Data
US 2015/0023775 A1 Jan. 22, 2015

Related U.S. Application Data

(60) Provisional application No. 61/597,346, filed on Feb. 10, 2012, provisional application No. 61/597,374, filed on Feb. 10, 2012, provisional application No. 61/597,380, filed on Feb. 10, 2012.

(51) Int. Cl.
| | |
|---|---|
| *G06F 7/00* | (2006.01) |
| *B65G 67/22* | (2006.01) |
| *G06T 7/00* | (2006.01) |
| *H04N 7/18* | (2006.01) |
| *G05D 1/02* | (2006.01) |
| *A01D 43/08* | (2006.01) |
| *B60P 1/42* | (2006.01) |
| *B65B 1/48* | (2006.01) |
| *B60R 11/04* | (2006.01) |
| *H04N 13/00* | (2006.01) |
| *B62D 6/00* | (2006.01) |
| *G06K 9/46* | (2006.01) |
| *G06K 9/52* | (2006.01) |
| *G06K 9/62* | (2006.01) |
| *G06T 7/20* | (2006.01) |
| *G06T 7/60* | (2006.01) |

(52) U.S. Cl.
CPC ............. *B65G 67/22* (2013.01); *A01D 43/087* (2013.01); *B60P 1/42* (2013.01); *B60R 11/04* (2013.01); *B62D 6/001* (2013.01); *B65B 1/48* (2013.01); *G05D 1/021* (2013.01); *G05D 1/0246* (2013.01); *G06K 9/46* (2013.01); *G06K 9/52* (2013.01); *G06K 9/6215* (2013.01); *G06T 7/004* (2013.01); *G06T 7/0075* (2013.01); *G06T 7/0085* (2013.01); *G06T 7/20* (2013.01); *G06T 7/602* (2013.01); *H04N 7/18* (2013.01); *H04N 7/181* (2013.01); *H04N 7/183* (2013.01); *H04N 13/0022* (2013.01); *G06K 2009/4666* (2013.01); *G06T 2207/10021* (2013.01); *G06T 2207/10028* (2013.01); *G06T 2207/20061* (2013.01); *G06T 2207/20228* (2013.01); *G06T 2207/30252* (2013.01)

(58) Field of Classification Search
CPC ............ B60P 1/42; B65B 1/48; B65G 65/28; B65G 65/30; B65G 65/32
USPC ......... 700/214, 275, 302; 414/334, 335, 345, 414/373, 374, 376, 389, 390, 397, 813
See application file for complete search history.

(56) References Cited

U.S. PATENT DOCUMENTS

| | | | |
|---|---|---|---|
| 5,646,844 | A | 7/1997 | Gudat et al. |
| 5,712,782 | A | 1/1998 | Weigelt et al. |
| 5,742,340 | A | 4/1998 | Alves |
| 5,749,783 | A | 5/1998 | Pollklas |
| 5,842,920 | A * | 12/1998 | Siepker .............. A01D 41/1275 414/345 |
| 6,216,071 | B1 | 4/2001 | Motz |
| 6,682,416 | B2 | 1/2004 | Behnke et al. |
| 6,687,616 | B1 | 2/2004 | Peterson et al. |
| 6,732,024 | B2 | 5/2004 | Wilhelm Rekow et al. |
| 6,943,824 | B2 | 9/2005 | Alexia et al. |
| 7,277,784 | B2 | 10/2007 | Weiss |
| 7,537,519 | B2 * | 5/2009 | Huster ................. A01D 43/087 141/231 |
| 7,860,301 | B2 | 12/2010 | Se et al. |
| 8,060,283 | B2 | 11/2011 | Mott et al. |
| 2003/0174207 | A1 | 9/2003 | Alexia et al. |
| 2005/0074183 | A1 | 4/2005 | Narlow |
| 2006/0047418 | A1 | 3/2006 | Metzler et al. |
| 2006/0094487 | A1 | 5/2006 | Huster et al. |
| 2009/0044505 | A1 * | 2/2009 | Huster ................. A01D 43/087 56/10.2 R |
| 2009/0099775 | A1 | 4/2009 | Mott et al. |
| 2009/0173409 | A1 | 7/2009 | Ozanne et al. |
| 2009/0298539 | A1 | 12/2009 | Anderson |
| 2010/0042248 | A1 * | 2/2010 | Mylet .................... B65G 67/06 700/214 |
| 2010/0063692 | A1 | 3/2010 | Madsen et al. |
| 2010/0070144 | A1 | 3/2010 | Burke et al. |
| 2010/0097455 | A1 | 4/2010 | Zhang et al. |
| 2010/0108188 | A1 | 5/2010 | Correns et al. |
| 2010/0232698 | A1 | 9/2010 | Bentrem |
| 2010/0332051 | A1 | 12/2010 | Kormann |
| 2011/0022273 | A1 | 1/2011 | Peters et al. |
| 2011/0061762 | A1 | 3/2011 | Madsen et al. |
| 2011/0205084 | A1 | 8/2011 | Morselli et al. |

FOREIGN PATENT DOCUMENTS

| | | |
|---|---|---|
| EP | 2138027 A1 | 12/2009 |
| EP | 2301318 B1 | 11/2011 |
| EP | 2311307 B1 | 12/2011 |
| EP | 2020174 B1 | 2/2012 |
| JP | 2177815 A | 7/1990 |
| WO | 2011101458 A1 | 8/2011 |

OTHER PUBLICATIONS

International Search Report and Written Opinion of the International Searching Authority for PCT Application PCT/US2013/025604 dated Dec. 9, 2013, (18 pages).
Borthwick, J., "Mining haul truck pose estimation and load profiling using stereo vision." PhD diss., University of British Columbia, 2009, (94 pages).
Singh, S., et al., "Autonomous Cross-Country Navigation Using Stereo Vision." Carnegie Mellon University, The Robotics Institute, Jan. 1999, (76 pages).
AgCam Photo Album [online]. 2009 [retrieved on Oct 3, 2012]. Retrieved from the Internet: <URL: http://dakotamicro.com/docs/AgCam Photo Album.pdf>, (31 pages).

* cited by examiner

*Primary Examiner* — Mark Beauchaine
(74) *Attorney, Agent, or Firm* — David G. Oberdick; Michael G. Monyok

(57) ABSTRACT

First imaging device collects first image data, whereas second imaging device collects second image data of a storage portion. A container identification module identifies a container perimeter of the storage portion in at least one of the collected first image data and the collected second image data. A spout identification module is adapted to identify a spout of the transferring vehicle in the collected image data. An image data evaluator determines whether to use the first image data, the second image data, or both based on an evaluation of the intensity of pixel data or ambient light conditions. An alignment module is adapted to determine the relative position of the spout and the container perimeter and to generate command data to the propelled portion to steer the storage portion in cooperative alignment such that the spout is aligned within a central zone or a target zone of the container perimeter.

26 Claims, 9 Drawing Sheets

SYSTEM AND METHOD OF MATERIAL HANDLING USING ONE OR MORE IMAGING DEVICES ON THE TRANSFERRING VEHICLE TO CONTROL THE MATERIAL DISTRIBUTION INTO THE STORAGE PORTION OF THE RECEIVING VEHICLE

CROSS-REFERENCE TO RELATED APPLICATIONS

This application is the US national phase application of PCT International Application PCT/US2013/025604, filed Feb. 11, 2013, titled METHOD AND STEREO VISION SYSTEM FOR FACILITATING THE UNLOADING OF AGRICUTURUAL MATERIAL FROM A VEHICLE, which claims the priority of U.S. Provisional Application 61/597,346, filed Feb. 10, 2012, titled METHOD AND STEREO VISION SYSTEM FOR FACILITATING THE UNLOADING OF AGRICUTURUAL MATERIAL FROM A VEHICLE, which is incorporated by reference herein.

JOINT RESEARCH AGREEMENT

This application resulted from work performed under or related to a joint research agreement between Carnegie Mellon University and Deere & Company, entitled "Development Agreement between Deere & Company and Carnegie Mellon University," dated Jan. 1, 2008 and as such is entitled to the benefits available under 35 U.S.C. §103(c).

FIELD OF THE INVENTION

This invention relates to a method and stereo vision system for facilitating the unloading of material from a vehicle.

BACKGROUND

Certain prior art systems may attempt to use global positioning system (GPS) receivers to maintain proper spacing between two vehicles during the unloading or transferring of agricultural material or other material, such as coal and other minerals, between the vehicles. However, such prior art systems are susceptible to misalignment of the proper spacing because of errors or discontinuities in the estimated position of the GPS receivers. For example, one or more of the GPS receivers may misestimate its position because of electromagnetic interference, multipath propagation of the received satellite signals, intermittent reception of the satellite signals or low received signal strength of the satellite signals, among other things. If the vehicles use cameras or other imaging devices in an outdoor work area, such as an agricultural field, the imaging devices may be subject to transitory sunlight, shading, dust, reflections or other lighting conditions that can temporarily disrupt proper operation of the imaging devices; hence, potentially produce errors in estimated ranges to objects observed by the imaging devices. Thus, there is a need for an improved system for managing the unloading of agricultural material from a vehicle to compensate for or address error in the estimated positions or alignment of the vehicles.

SUMMARY OF THE INVENTION

The system and method facilitates the transfer of agricultural material from a transferring vehicle (e.g., harvesting vehicle) to a receiving vehicle (e.g., grain cart). The system and method comprises a receiving vehicle, which has a propelled portion for propelling the receiving vehicle and a storage portion for storing agricultural material and a transferring vehicle for transferring harvested agricultural material into the storage portion of the receiving vehicle.

Two embodiments of the present invention include one or two imaging devices on only the transferring vehicle, either a combine or a self-propelled forge harvester. A first embodiment mounts one or two primary imaging device on the combine (a transferring vehicle) and no imaging devices mounted on the receiving vehicle. A second embodiment mounts one or two imaging devices on the self-propelled forge harvester, also a transferring vehicle, and no imaging devices on the receiving vehicle.

Embodiments of the present invention include a first imaging device that is mounted at a first location on the receiving vehicle and faces towards the storage portion of the receiving vehicle. The first imaging device collects first image data. A second imaging device is associated with a second location on (e.g., mounted on or movably attached to) the transferring vehicle and faces towards the storage portion of the receiving vehicle. The second imaging device collects second image data.

The transferring vehicle of any of the above mentioned embodiments can include as an image processing module having a container or bin identification module that can identify a container or bin perimeter of the storage portion in at least one of the collected first image data and the collected second image data (where a second imaging device is incorporated into the system configuration). The image processing can also include a spout localizer that is adapted to identify a spout of the transferring vehicle in the collected image data (collected first image data, collected second image data, or both). The image processing module can include an image data evaluator that determines whether to use the first image data, the second image data or both (where a second imaging device is incorporated into the system configuration), based on an evaluation of material variation of intensity of pixel data or material variation in ambient light conditions during a sampling time interval. In a system with only one imaging device, the image data evaluator is either not activated, is not incorporated into the system, or includes logic that passes the only collected image to the next function. The image processing module can also include an alignment module that is adapted to determine the relative position of the spout and the container perimeter, and to generate command data to the steering controller of the transferring vehicle to steer the transferring vehicle in cooperative alignment with the receiving vehicle such that the spout is aligned within a central zone (or other target zone) of the container perimeter.

In operation, a method for facilitating the transfer of material from a transferring vehicle having a material distribution end to a receiving vehicle having a bin to the store transferred material, the method comprising the steps of:
  a. identifying and locating the bin;
  b. detecting a representation of the fill level or volumetric distribution of the material in the bin;
  c. aligning the material distribution end over a current target area of the bin requiring the material (wherein a current target area can be an initial target area the material distribution end is positioned when the filling of material begins);
  d. determining subsequent target areas of the bin that require material based on the representation of the fill level or volumetric distribution of the material in the bin and a desired fill pattern (such as front-to-back, back-to-front, center-to-front-to-back, center-to-back-to-front) to fill the bin;

e. transferring the material from the transferring vehicle to the current target area of the bin of the receiving vehicle;

f. detecting when the current target area of the bin is filled with the material;

g. repeating steps c-f until the subsequent target areas of the bin are filled; and h. terminating the transfer of the material from the transferring vehicle to the receiving vehicle.

DETAILED DESCRIPTION OF THE INVENTION

Figure 1:
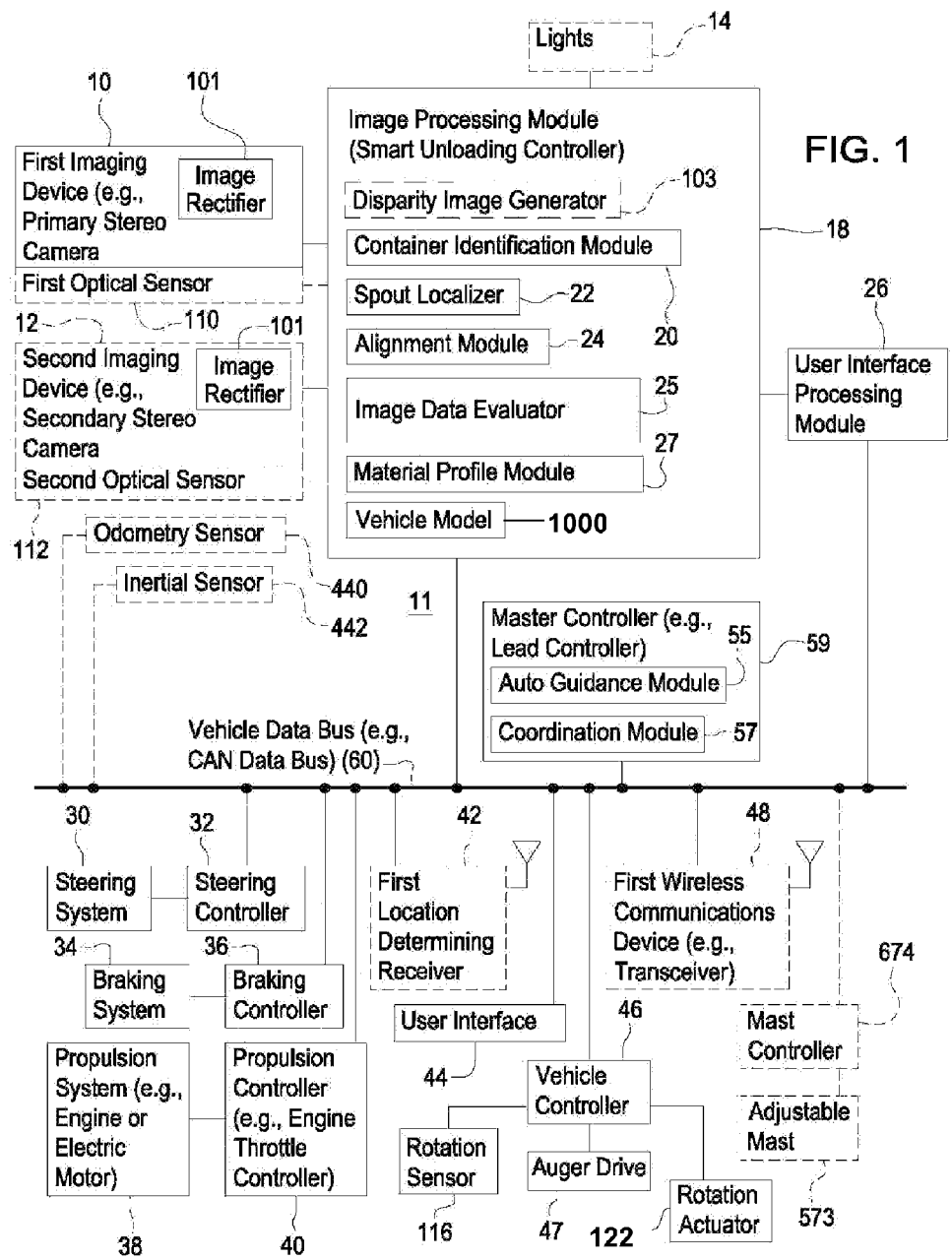
FIG. 1 is a block diagram of one embodiment of a machine vision-augmented guidance system for a transferring vehicle being a combine for facilitating the unloading of agricultural material from the transferring vehicle (e.g., combine)
Figure 2:
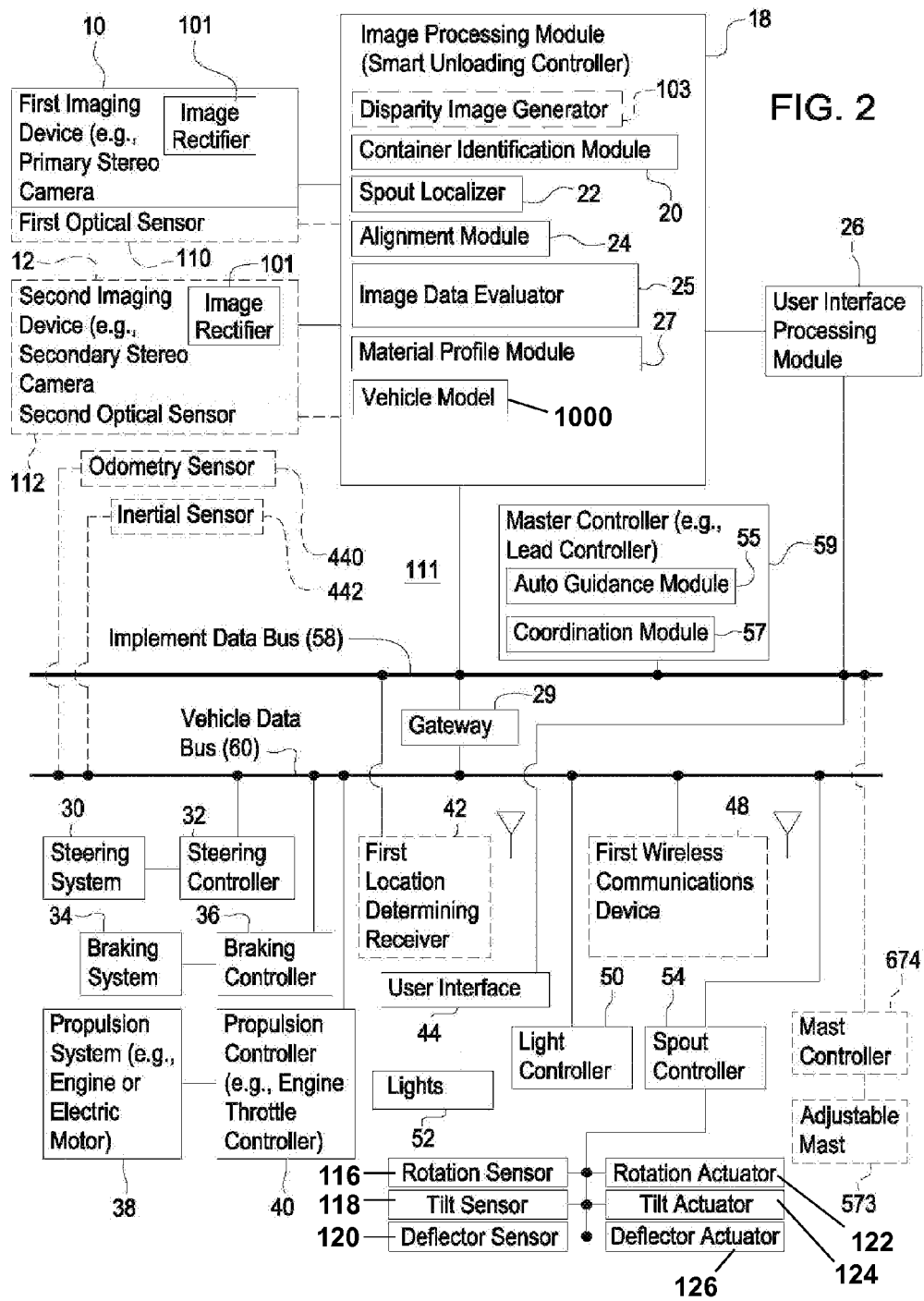
FIG. 2 is a block diagram of another embodiment of a machine vision-augmented guidance for a transferring vehicle being a self-propelled forge harvester for facilitating the unloading of agricultural material from the transferring vehicle.
Figure 3:
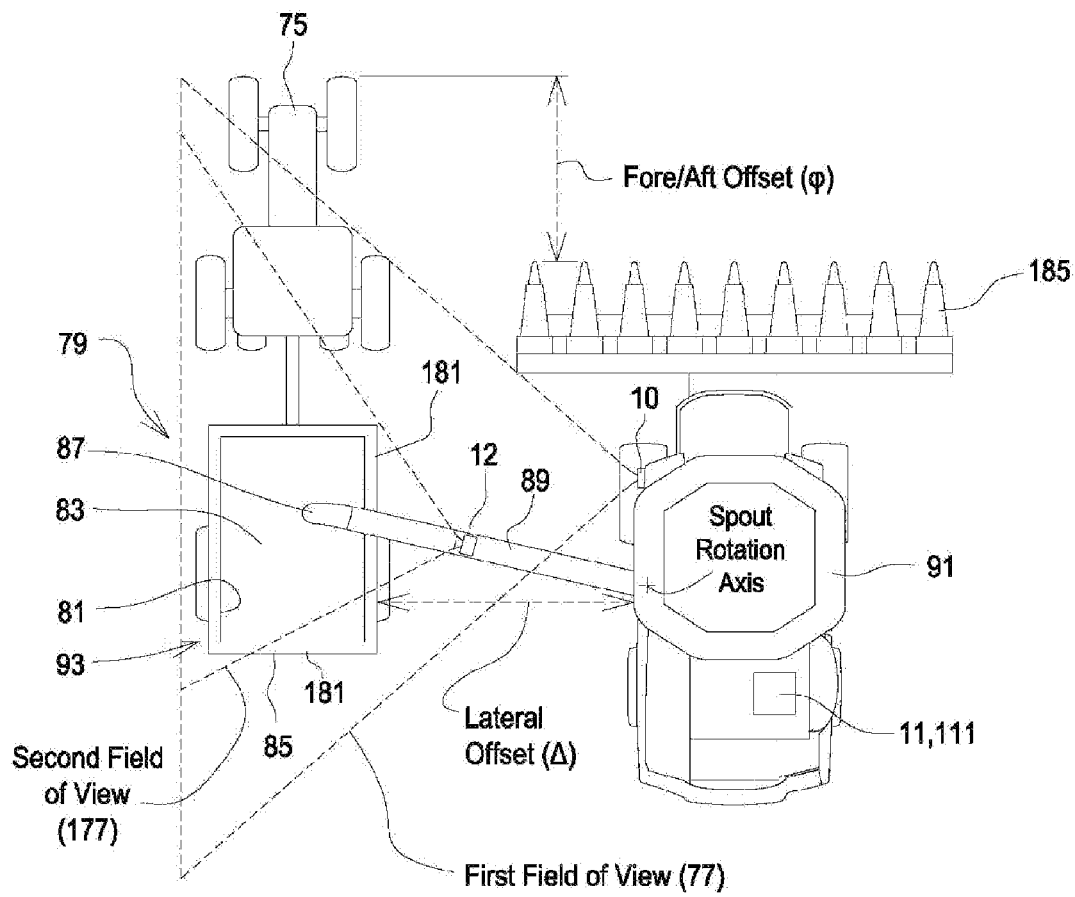
FIG. 3 illustrates a top view of an imaging devices mounted on a transferring vehicle and facing toward a receiving vehicle.

In accordance with one embodiment of the present invention that requires imaging devices on the transferring vehicle, FIGS. 1 and 2 show machine vision augmented guidance systems 11, 111 for a transferring vehicle 91 (FIG. 3) for managing the unloading of agricultural material (e.g., grain) from the transferring vehicle 91 (FIG. 1—combine; FIG. 2—self-propelled forge harvester) to a receiving vehicle 79 (e.g., grain cart or wagon). The transferring vehicle 91 may comprise other vehicles such as a harvester or other heavy equipment that collects or harvests material for transfer to the receiving vehicle. For example, a stereo imaging system augments satellite navigation receivers or location-determining receivers 42 for guidance of the transferring vehicle 91. Now turning to FIG. 3, the first imaging device 10 has a first field of view 77, indicated by the dashed lines. The second imaging device 12 has a second field of view 177, indicated by the dashed lines. The boundaries of the fields of view 77, 177 are merely shown for illustrative purposes and will vary in actual practice. The systems 11, 111 can comprises a first imaging device 10 and a second imaging device 12 coupled to an image processing module 18 (FIGS. 1 and 2). Embodiments of first imaging device 10 may comprise a primary stereo camera or a monocular camera, while the second imaging device 12 may comprise a secondary stereo camera or a monocular camera. In one configuration, the second imaging device 12 is a stereo camera and can be optional and provides redundancy to the first imaging device 10 in case of failure, malfunction or unavailability of image data from the first imaging device 10 when the first field of view 77 of the first imaging device 10 is sufficient to view within container 85. In one configuration, the second imaging device is monocular and is required for a stereo image of the container or bin 85 when used in conjunction with an image from a monocular first imaging device 10 with the first field of view 77 sufficient to view within container 85. FIG. 3 illustrates a plan view of a transferring vehicle 91 and a receiving vehicle 79. As illustrated in FIG. 3 for explanatory purposes, the transferring vehicle 91 is shown as a combine with a harvesting head 185, whereas the receiving vehicle 79 is shown as a tractor and a grain cart. More generally, the receiving vehicle 79 comprises the combination of a propulsion unit 75 and a storage unit 93 (e.g., a towed storage unit). Each imaging device 10, 12 includes an image rectifier 101 to transform the raw image into a rectified image. Though the example of transferred material disclosed herein is agricultural material, the invention is not to be limited to agricultural material and is applicable to other materials such as coal and other minerals.

FIG. 3 shows a first imaging device 10 on the transferring vehicle 91 (e.g., combine) and a second imaging device 12 on a spout 89 of the transferring vehicle 91. The second imaging device 12 can be optional if the first imaging device 10 is a stereo camera and the first field of view 77 of the first imaging device 10 is sufficient to view within container 85. The spout 89 may also be referred to as an unloading auger. The spout end 87 may be referred to as a boot. In FIG. 3, the spout 89, or the spout end 87, is generally aligned over a central zone 83, central region or target area with the grid pattern 82 (FIGS. 4A and 4B) of the storage container 85 of the receiving vehicle 79 for unloading material from the transferring vehicle 91 to the receiving vehicle 79. Similarly, the transferring vehicle 91 and the receiving vehicle 79 are aligned in position as shown, regardless of whether the vehicles move together in a forward motion (e.g., with coordinated or tracked vehicle headings) during harvesting, as is typical, or are stationary. During unloading, the master controller 59 (FIGS. 1 and 2) facilitate maintenance of a generally uniform spatial offset (e.g., a generally static offset that varies only within a predetermined target tolerance) between the vehicles 91, 79, subject to any incremental adjustment of the offset for uniform filling of the container 85. The master controller 59 supports maintenance of a uniform fore/aft offset ($\Phi$ or $\phi$) and a lateral offset ($\Delta$).

Now returning to FIGS. 1, 2, and 3, the transferring vehicle 91 may be equipped with a spout rotation sensor 116 to measure the rotation angle of the spout 89. For a spout-mounted imaging device 12, the rotation angle of the spout 89 may be used to facilitate fusion of image data from the first imaging device 10 and the second imaging device 12, or to construct stereo image data where the first imaging device 10 and the second imaging device 12 individually provide monocular image data for the same scene or object.

In any arrangement of imaging devices 10, 12 disclosed herein where the fields of view 77, 177 overlap, data fusion of image data from a first imaging device 10 and a second imaging device 12 enables the image processing module 18 to create a virtual profile of the material distribution level (FIG. 4D) inside the storage portion 85, even when the entire surface of the agricultural material is not visible to one of the two imaging devices 10, 12. Even if the second imaging device 12 is not mounted on the spout 89 in certain configurations, the spout rotation sensor 116 may facilitate using the spout end 87 as a reference point in any collected image data (e.g., for fusion, virtual stitching or alignment of image data from different imaging devices.) The virtual profile of the entire surface of the agricultural material in the storage portion 93 enables the systems 11, 111 or imaging module 18 to intelligently execute a fill strategy for the storage portion 93 of the receiving vehicle 79.

The first imaging device 10 and the second imaging device 12 may provide digital data format output as stereo video image data or a series of stereo still frame images at regular or periodic intervals, or at other sampling intervals. Each stereo image (e.g., the first image data or the second image data) has two component images of the same scene or a portion of the same scene. For example, the first imaging device 10 has a first field of view 77 of the storage portion 93 of the receiving vehicle 79, where the first field of view 77 overlaps at least partially with a second field of view 177 of the second imaging device 12 (if present). In one embodiment, the first imaging device 10, the second imaging device 12, or both may comprise a charge-coupled device (CCD), a complementary metal-oxide semiconductor (CMOS) array, or another suitable device for detection or collection of image data.

In one configuration, an optical sensor 110, 112 comprises a light meter, a photo-sensor, photo-resistor, photo-sensitive device, or a cadmium-sulfide cell. A first optical sensor 110 may be associated with the first imaging device 10; a second optical sensor 112 may be associated with the second imaging device 12. The first optical sensor 110 and the second optical sensor 112 each may be coupled to the image processing module 18. The optical sensor 110, 112 provides a reading or level indicative of the ambient light in the field of view of its respective imaging device 10, 12.

The image processing module 18 may be coupled, directly or indirectly, to lights 14 (FIG. 1) on a transferring vehicle 91 for illumination of a storage container 85 and/or spout 89. For example, the image processing module 18 may include a light controller 50 (FIG. 2) that comprises control drivers, relays or switches, which in turn control the activation or deactivation of lights 14 on the transferring vehicle 91. The image processing module 18 may activate the lights 14, 52 on the transferring vehicle for illumination of the storage container 85 (FIG. 3A), spout 89 or both if an optical sensor 110, 112 or light meter indicates that an ambient light level is below a certain minimum threshold. In one configuration the optical sensor 110, 112 face toward the same direction as the lens or aperture of the imaging devices 10, 12.

Figure 5A:
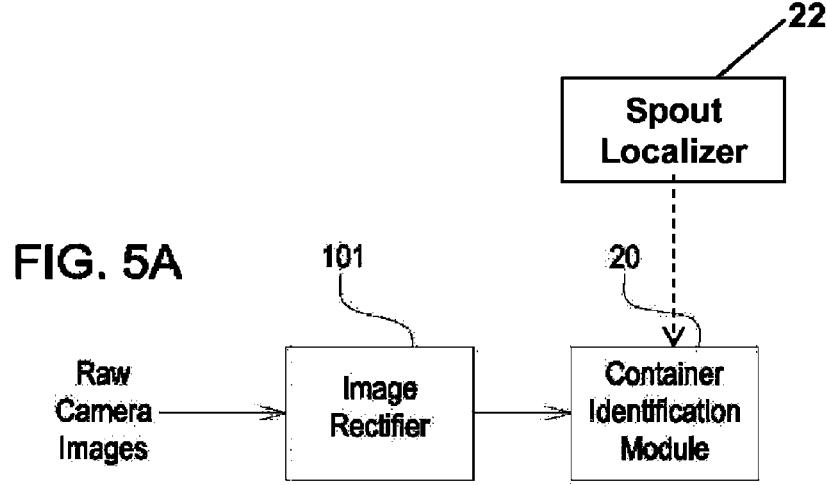
FIG. 5A illustrates a block diagram of a container identification process using rectified images.

In the combine embodiment (FIG. 1), vehicle controller 46 controls spout 89 that includes a rotation sensor 116 for sensing a spout rotation angle ($\alpha$) in FIG. 5A and ($\beta$) in FIG. 5C of the spout 89 with respect to one or more axes of rotation, and a rotation actuator 216 for moving the spout 89 to change the spout rotation angle; hence, the spout 89 position with respect to the receiving vehicle 79 or its storage container 85. The rotation actuator 216 may comprise a motor, a linear motor, an electro-hydraulic device, a ratcheting or cable-actuated mechanical device, or another device for moving the spout 89, or the spout end 87. The spout rotation angle may comprise a simple angle, a compound angle or multi-dimensional angles that is measured with reference to a reference axis parallel to the direction of travel of the transferring vehicle.

If the rotation actuator 216 comprises an electro-hydraulic device, the use of proportional control valves in the hydraulic cylinder of the electro-hydraulic device that rotates the spout (or changes the spout rotation angle) facilitates finer adjustments to the spout angle (e.g., a) than otherwise possible. Accordingly, proportional control valves of the electro-hydraulic device support rotation actuator 216 for an even profile or distribution of unloaded agricultural material within the storage portion 93 or container or bin 85. Many commercially available combines are typically equipped with non-proportional control valves for controlling spout angle or movement of the spout 89; electro-hydraulic devices with non-proportional control valves can fill the storage container with an inefficient multi-modal or humped distribution (e.g., 508) of agricultural material with local high areas and local low areas, as depicted in FIG. 4D, for example.

A vehicle controller 46 may be coupled to the vehicle data bus 60 to provide a data message that indicates when the auger drive 47 for unloading agricultural material from the transferring vehicle is activated and inactive. The auger drive 47 may comprise an auger, an electric motor for driving the auger, and a rotation sensor for sensing rotation or rotation rate of the auger or its associated shaft. In one embodiment, the auger (not shown) is associated with a container for storing agricultural material (e.g., a grain tank) of a transferring vehicle 91. If the vehicle controller 46 (e.g., auger controller) indicates that the auger of the transferring vehicle 91 is rotating or active, the imaging processing module 18 activates the spout localizer 22 and container or bin identification module 20. Thus, vehicle controller 46 may conserve data processing resources or energy consumption by placing the container identification module 20 and the spout identification module 22 in an inactive state (or standby mode) while the transferring vehicle 91 is harvesting, but not unloading, the agricultural material to the receiving vehicle 79.

In FIG. 1, the imaging processing module 18 or any other controller may comprise a controller, a microcomputer, a microprocessor, a microcontroller, an application specific integrated circuit, a programmable logic array, a logic device, an arithmetic logic unit, a digital signal processor, or another data processor and supporting electronic hardware and software. In one embodiment, the image processing module 18 comprises a disparity generator 103, a container identification module 20, a spout localizer 22, an alignment module 24, a material profile module 27, and a vehicle model 1000.

The image processing module 18 may be associated with a data storage device may comprise electronic memory, non-volatile random access memory, a magnetic disc drive, an optical disc drive, a magnetic storage device or an optical storage device, for example. If the container identification module 20, the spout localizer 22, the alignment module 24, material profile module 27, and vehicle model 1000, are software modules they are stored within the data storage device.

The container identification module 20 identifies a set of two-dimensional or three dimensional points (e.g., in Cartesian coordinates or Polar coordinates) in the collected image data or in the real world that define at least a portion of the container perimeter 81 of the storage portion 85 (FIG. 3). The set of two-dimensional or three dimensional points correspond to pixel positions in images collected by the first imaging device 10, the second imaging device 12, or both. The container identification module 20 may use or retrieve container reference data.

The container reference data comprises one or more of the following: reference dimensions (e.g., length, width, height), volume, reference shape, drawings, models, layout, and configuration of the container 85, the container perimeter 81, the container edges 181; reference dimensions, reference shape, drawings, models, layout, and configuration of the entire storage portion 93 of receiving vehicle; storage portion wheelbase, storage portion turning radius, storage portion hitch configuration of the storage portion 93 of the receiving vehicle; and distance between hitch pivot point and storage portion wheelbase. The container reference data may be stored and retrieved from the data storage device (e.g., non-volatile electronic memory). For example, the container reference data may be stored by, retrievable by, or indexed by a corresponding receiving vehicle identifier in the data storage device of the transferring vehicle systems 11, 111. For each receiving vehicle identifier, there can be a corresponding unique container reference data stored therewith in the data storage device.

In one configuration, the container identification module 18 identifies the position of the container or bin 85 as follows. If the linear orientation of a set of pixels in the collected image data conforms to one or more edges 181 of the perimeter 81 of the container 85 as prescribed by the container reference data, the position of the container 85 has been identified. A target zone, central region or central zone of the container opening 83 of the container 85 can be identified by dividing (by two) the distance (e.g., shortest distance or surface normal distance) between opposite sides of the container, or by identifying corners of the container and where diagonal lines that intercept the corners intersect, among other possibilities. In one configuration, the central zone may be defined as an opening (e.g., circular, elliptical or rectangular) in the container with an opening surface area that is greater than or equal to the cross-sectional surface area of the spout end by a factor of at least two, although other surface areas fall within the scope of the claims.

The spout localizer 22 identifies one or more of the following: (1) the spout pixels on at least a portion of the spout 89, or (2) spout end pixels that are associated with the spout end 87 of the spout 89. The spout identification module 22 may use color discrimination, intensity discrimination, or texture discrimination to identify background pixels from one or more selected spout pixels with associated spout pixel patterns or attributes (e.g., color or color patterns (e.g., Red Green Blue (RGB) pixel values), pixel intensity patterns, texture patterns, luminosity, brightness, hue, or reflectivity) used on the spout 89 or on the spout end 87 of the spout 89 for identification purposes.

The alignment module 24, the master controller 59, or both estimate or determine motion commands at regular intervals to maintain alignment of the spout 56 over the central zone, central region or target of the container 85 for unloading agricultural material. The alignment module 24, the master controller 59, or both, may send commands or requests to the transferring vehicle 91 with respect to its speed, velocity or heading to maintain alignment of the position of the transferring vehicle 91 with respect to the receiving vehicle 79. For example, the alignment module 24 may transmit a request for a change in a spatial offset between the vehicles 79, 91 to the master controller 59. In response, the master controller 59 or the coordination module 57 transmits a steering command or heading command to the steering controller 32, a braking or deceleration command to a braking system 34, and a propulsion, acceleration or torque command to a propulsion controller 40 to achieve the target spatial offset or change in spatial offset.

In another configuration, the alignment module 24 may regularly or periodically move, adjust or rotate the target zone or central zone during loading of the container 85 of the receiving vehicle to promote even filling, a uniform height, or uniform distribution of the agricultural material in the entire container 85, where the image processing module 18 identifies the fill state of the agricultural material in the image data from the material profile module 27.

The imaging module 18 may comprise material profile module 27 or a fill level sensor for detecting a one-dimensional, two-dimensional or three-dimensional representation of the fill level or volumetric distribution of the agricultural material in the container 85 or storage portion 93. For example, FIG. 4D shows various illustrative two-dimensional representations of the fill state of the container 85, or the distribution of agricultural material in the container 85, where FIG. 4D will be described later in detail.

In one configuration, the coordination module 57 or the steering controller 32 adjusts the relative position (of offset) of the transferring vehicle 91 to the receiving vehicle 79. The alignment module 24, the coordination module 57 and the auger rotation system 116 may control the relative position of the spout 89 or the spout end 87 to the container perimeter 81 to achieve an even fill to the desired fill level. For example, rotator actuator 216 of the combine may adjust the spout angle (e.g., a first spout angle ($\alpha$), a second spout angle ($\beta$) or a compound angle ($\alpha$ and $\beta$)) that the spout 89 makes with respect to a reference axis or reference coordinate system associated with the transferring vehicle 91 or a generally vertical plane associated with the direction of travel of the transferring vehicle 91, where the spout 89 meets and rotates with respect to the vehicle. With regards to the self-propelled forge harvester, the spout angle is controlled by spout controller 54 in communication with rotation sensor 116, tilt sensor 118, deflector sensor 120, rotation actuator 122, tilt actuator 124, and deflector actuator 126.

The spout end 87 may be adjusted for unloading agricultural material by shifting its spout angle or spout position, within the container perimeter 81 and a tolerance clearance from the container perimeter 81 within the container 85. The spout end 87 may be adjusted by various techniques that may be applied alternately, or cumulatively. Under a first technique, the alignment module 24 adjusts the spout end 87 for unloading agricultural material by shifting its spout angle (e.g., a first spout angle ($\alpha$), a second spout angle ($\beta$), or both ($\alpha$ and $\beta$). Under a second technique, the alignment module 24 requests (or commands) the coordination module 57 to adjust the fore/aft offset adjustment ($\Phi$ or $\phi$), the lateral adjustment ($\Delta$), or both, where the coordination module 57 manages or choreographs the relative fore/aft offset and lateral offset between the transferring vehicle 91 and receiving vehicle 79. Under a third technique, the alignment module 24 primarily adjusts the spout end 87 for unloading agricultural material by shifting its spout angle and the coordination module 57 secondarily and regularly (e.g., periodically) moves the fore/aft offset and the lateral offset by fore/aft offset adjustment ($\Phi$ or $\phi$), the lateral adjustment ($\Delta$), respectively, to achieve a uniform fill state or level loading of the container with the agricultural material. Accordingly, the spout end 87 may be adjusted regularly (e.g., in a matrix of one or more rows or columns of preset offset positions) for unloading agricultural material by shifting the spatial relationship between the transferring vehicle and the receiving vehicle by a fore and aft offset or a lateral offset to achieve a target alignment or desired even distribution of filling the container 85 or storage portion 93 with agricultural material (FIG. 4E), while using the spout angle adjustment for fine tuning of the distribution of the agricultural material within the container (e.g., from each position within the matrix).

In the image processing module 18, the image data evaluator 25 comprise an evaluator, a judging module, Boolean logic circuitry, an electronic module, a software module, or software instructions for determining whether to use the first image data, the second image data, or both for alignment of a relative position of the spout and the container perimeter (or alignment of the spatial offset between the vehicles) based on evaluation of material variation of intensity of pixel data or material variation in ambient light conditions during a sampling time interval.

In the combine, master controller 59 is coupled to the vehicle data bus (e.g., 60). Whereas in the self-propelled forge harvester, master controller 59 is coupled to the implement data base 58 that is connected to vehicle data bus 60 via gateway 29. In one embodiment, the master controller 59 comprises an auto-guidance module 55 and coordination module 57. The auto-guidance module 55 or master controller 59 can control the transferring vehicle 91 in accordance with location data from the first location determining receiver 42 and a path plan or desired vehicle path (e.g., stored in data storage). The auto-guidance module 55 or master controller 59 sends command data to the steering controller 32, the braking controller 36 and the propulsion controller 40 to control the path of the transferring vehicle 91 to track automatically a path plan or to track manually steered course of an operator via the user interface 44 or steering system 30.

The coordination module 57 may facilitate alignment of movement (e.g., choreography) between the transferring vehicle 91 and the receiving vehicle 79 during unloading or transferring of agricultural material between the vehicles. For example, the coordination module 57 may facilitate maintenance of a uniform lateral offset ($\Delta$) and a uniform fore/aft offset ($\Phi$ or $\phi$) between the vehicles 91, 79 during unloading of the agricultural material, subject to any adjustments for attainment of a uniform distribution of material in the container 85. Collectively, the uniform lateral offset and uniform for/aft offset may be referred to as a uniform spatial offset. In certain embodiments, maintenance of the lateral offset and fore/aft offset, or coordination of any shift in the lateral offset and fore/aft offset (e.g., pursuant to a two-dimensional matrix of pre-established positions (x, y points) for uniform loading of a respective particular container or storage portion), is a necessary or desired precondition to implementing spout angle adjustment of the spout 89 or spout end 87 by the alignment module 24.

In one embodiment in a leader mode, the transferring vehicle 91 is steered by the auto-guidance module 55 or the steering controller 32 in accordance with path plan, or by a human operator. If the transferring vehicle 91 operates in an automated mode or auto-steering mode, the master controller 59 provides command data locally to the steering controller 32, braking controller 36, and propulsion engine controller 40 of the transferring vehicle 91. In an automated mode and in a leader-follower mode, the transferring vehicle 91 is steered and aligned automatically during transfer of agricultural material from the transferring vehicle 91 to the receiving vehicle 79.

The image processing module 18 provides image data (rectified, disparity, or both) to a user interface processing module 26 that provides, directly or indirectly, status message data and performance message data to a user interface 44.

In one embodiment, a location determining receiver 42, a first wireless communications device 48, a vehicle controller 46, a steering controller 32, a braking controller 36, and a propulsion controller 40 are capable of communicating over the vehicle data bus 60. In turn, the steering controller 32 is coupled to a steering system 30 of the transferring vehicle 91; the braking controller 36 is coupled to the braking system 34 of the transferring vehicle 91; and the propulsion controller 40 is coupled to the propulsion system 38 of the transferring vehicle 91.

The steering system 30 may comprise an electrically-driven steering system, an electro-hydraulic steering system, a gear driven steering system, a rack and pinion gear steering system, or another steering system that changes the heading of the transferring vehicle 91 or one or more wheels of the transferring vehicle 91. The braking system 34 may comprise a regenerative braking system, an electro-hydraulic braking system, a mechanical breaking system, or another braking system capable of stopping the vehicle by hydraulic, mechanical, friction or electrical forces. The propulsion system 38 may comprise one or more of the following: (1) the combination of an electric motor and an electric controller, (2) internal combustion engine that is controlled by an electronic fuel injection system or another fuel metering device that can be controlled by electrical signals, or (3) a hybrid vehicle in which an internal combustion engine drives a electrical generator, which is coupled to one or more electric drive motors.

The systems 11, 111 facilitate the transfer of agricultural material from the transferring vehicle 91 to a receiving vehicle 79 with a propelled portion 75 for propelling the receiving vehicle and a storage portion 93 for storing agricultural material. A stereo imaging device, such as the first imaging device 10, faces towards the storage portion 93 of the receiving vehicle 79. As shown in FIGS. 1 and 2, the first imaging device 10 and the optional second imaging device 12 are mounted on the transferring vehicle 91, consistent with FIG. 3.

In summary, one or more imaging devices 10, 12 are arranged to collect image data. A container identification module 20 identifies a container perimeter 81 of the storage portion 93 in the collected image data. The storage portion 93 has an opening inward from the container perimeter for receipt of the agricultural material. A spout localizer 22 is configured to identify a spout 89 of the transferring vehicle 91 in the collected image data. An alignment module 24 is adapted for determining the relative position of the spout 89 and the container perimeter 81 and for generating command data to the transferring vehicle 91 to steer the transferring vehicle 91 in cooperative alignment with receiving vehicle 79 such that the spout 89 is aligned within a central zone 83 or opening of grid pattern 82 of the container perimeter 81. A steering controller 32 is associated with a steering system 30 of the transferring vehicle 91 for steering the transferring vehicle 91 in accordance with the cooperative alignment.

In one embodiment, an optional mast controller 674, indicated by dashed lines, is coupled to the vehicle data bus 60 (FIG. 1) or the implement data bus 58 (FIG. 2) to control an optional adjustable mast 573 for mounting and adjustably positioning the first imaging device 10, the second imaging device 12, or both. The mast controller 674 is adapted to change the orientation or height above ground of the first imaging device 10, the second imaging device 12 or both, where the orientation may be expressed as any of the following: a tilt angle, a pan angle, a down-tilt angle, a depression angle, or a rotation angle.

In one illustrative embodiment of a machine-vision guidance system 11, 111 that has an adjustable mast 573, at least one imaging device 10, 12 faces towards the storage portion 93 of the receiving vehicle 79 and collects image data. For example, via data from the mast controller 674 the adjustable mast 573 is capable of adjusting a height of the imaging device 10, 12 within a height range, adjusting a down-tilt angle of the imaging device 10, 12 within a down-tilt angular range, and a rotational angle or pan angle within a pan angular range. The image processing module 18 is adapted or programmed (e.g., with software instructions or code) to determine whether to adjust the height of the imaging device 10, 12 or whether to decrement or increment the down-tilt angle of the imaging device 10, 12 based on evaluation of material variation of intensity of pixel data or material variation in ambient light conditions (e.g., from the optical sensor 110, 112) during a sampling time interval. Under certain operating conditions, such as outdoor ambient light conditions, increasing or incrementing the down-tilt angle may increase the quality level of the collected image data or reduce variation in the intensity of the image data to below a threshold variation level. Reduced variation in intensity of the image data or reduced collection of dust or debris on a lens of the imaging device are some advantages that can be realized by increasing or adjusting down-tilt angle of the imaging device 10, 12, for example. As previously noted, a container identification module 20 can identify a container perimeter 81 of the storage portion 93 in the collected image data. Similarly, a spout localizer 22 can identify a spout of the transferring vehicle 91 in the collected image data. An alignment module 24 determines the relative position of the spout 89 and the container perimeter 81 and generates command data to the steering controller 32 to steer the transferring vehicle 91 in cooperative alignment with the receiving vehicle 79 such that the spout 89, or spout end 87, is aligned within a target zone of the grid pattern 82 or central zone 83 of the container perimeter 81.

In one illustrative embodiment of a machine-vision guidance system with the adjustable mast 573, the image processing module 18 sends a data message to a mast controller 674 (or the adjustable mast 573) to increment or increase the down-tilt angle if the material variation of intensity of pixel data or if the material variation in ambient light conditions exceeds a threshold variation level during a sampling time interval. For example, the image processing module 18 sends a data message to a mast controller 674 to increment or increase the down-tilt angle at discrete levels (e.g., one degree increments or decrements) within an angular range of approximately negative ten degrees to approximately negative twenty-five degrees from a generally horizontal plane.

In one configuration, a user interface 44 is arranged for entering container reference data or dimensional parameters related to the receiving vehicle. For example, the container reference data or dimensional parameters comprise a distance between a trailer hitch or pivot point (which interconnects the propulsion unit 75 and the storage portion 93) and front wheel rotational axis of the storage portion 93 of the receiving vehicle 79.

In an alternate embodiment, the first imaging device 10 comprises a monocular imaging device and the second imaging device 12 comprises a monocular imaging device that provides first monocular image data and second monocular image data, respectively. The image processing module 18 can create a stereo image from the first monocular image data (e.g., right image data) and the second monocular image data (e.g., left image data) with reference to the relative position and orientation of the first imaging device 10 and the second imaging device 12. The image processing module 18 determines: (1) at least two points on a common visual axis that bisects the lenses of both the first imaging device 10 and the second imaging device 12, and (2) a linear spatial separation between the first imaging device 10 and the second imaging device 12, where the first field of view 477 (FIG. 4A) of the first imaging device 10 and the second field of view 277 (FIG. 4A) of the second imaging device 12 overlap, at least partially, to capture the spout 89, the spout end 87 and the container perimeter 81 in the collected image data.

In an alternate embodiment, FIGS. 1 and 2 further comprises an optional odometer sensor 440, and an optional inertial sensor 442, as illustrated by the dashed lines. The odometer sensor 440 may comprise a magnetic rotation sensor, a gear driven sensor, or a contactless sensor for measuring the rotation of one or more wheels of the transferring vehicle to estimate a distance traveled by the transferring vehicle during a measurement time period, or a ground speed of the transferring vehicle. The odometry sensor 440 may be coupled to the vehicle data bus 60 or an implement data bus 58. The inertial sensor 442 may comprise one or more accelerometers, gyroscopes or other inertial devices coupled to the vehicle data bus 60 or an implement data bus 58. The optional odometry sensor 440 and the optional inertial sensor 442 may augment or supplement position data or motion data provided by the first location determining receiver 42.

The vision-augmented guidance system 111 of FIG. 2 is similar to the system 11 of FIG. 1; except that the system 111 of FIG. 2 further comprises an implement data bus 58, a gateway 29, and light controller 50 and spout controller 54 coupled to the vehicle data bus 60 for the lights 14 and spout 89, respectively. The light controller 50 controls the lights 14; the spout controller 54 controls the spout 89 via a servo-motor, electric motor, or an electro-hydraulic mechanism for moving or adjusting the orientation or spout angle of the spout 89, or its spout end 87. In one configuration, the implement data bus 58 may comprise a Controller Area Network (CAN) implement data bus. Similarly, the vehicle data bus 60 may comprise a controller area network (CAN) data bus. In an alternate embodiment, the implement data bus 58, the vehicle data bus 60, or both may comprise an ISO (International Organization for Standardization) data bus or ISOBUS, Ethernet or another data protocol or communications standard.

The self-propelled forge harvester includes gateway 29 to support secure or controlled communications between the implement data bus 58 and the vehicle data bus 60. The gateway 29 comprises a firewall (e.g., hardware or software), a communications router, or another security device that may restrict or prevent a network element or device on the implement data bus 58 from communicating (e.g., unauthorized communication) with the vehicle data bus 60 or a network element or device on the vehicle data bus 31, unless the network element or device on the implement data bus 58 follows a certain security protocol, handshake, password and key, or another security measure. Further, in one embodiment, the gateway 29 may encrypt communications to the vehicle data bus 60 and decrypt communications from the vehicle data bus 60 if a proper encryption key is entered, or if other security measures are satisfied. The gateway 29 may allow network devices on the implement data bus 58 that communicate via an open standard or third party hardware and software suppliers, whereas the network devices on the vehicle data bus 60 are solely provided by the manufacturer of the transferring vehicle (e.g., self-propelled forage harvester) or those authorized by the manufacturer.

In FIG. 2, a first location determining receiver 42, a user interface 44, a user interface processing module 26, and the gateway 29 are coupled to the implement data bus 58, although in other embodiments such elements or network devices may be connected to the vehicle data bus 60. Light controller 50 and spout controller 54 are coupled to the vehicle data bus 60. In turn, the light controller 50 and spout controller 54 are coupled, directly or indirectly, to lights 14 on the transferring vehicle 91 and the spout 89 of the transferring vehicle 91 (e.g., self-propelled forage harvester), respectively. Although the system of FIG. 2 is well suited for use or installation on a self-propelled forage harvester (SPFH), the system of FIG. 2 may also be applied to harvesters or other heavy equipment.

Figure 4A:
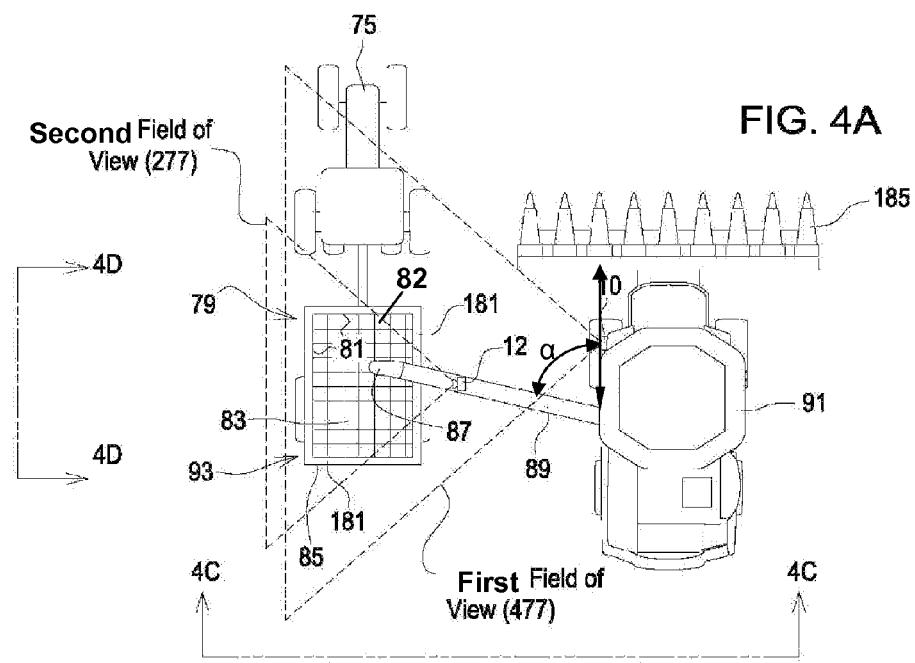
FIG. 4A illustrates a top view of imaging devices (e.g., a monocular or stereo vision system) mounted on a transferring vehicle and facing a storage portion of the receiving vehicle.

FIG. 4A illustrates a top view of a transferring vehicle 91 and a receiving vehicle 79. Like reference numbers indicate like elements in FIG. 4A and FIG. 3. FIG. 4A shows a first imaging device 10 on the body of the transferring vehicle 91. The first imaging device 10 has a first field of view 477 indicated by the dashed lines. In FIG. 4A, the spout 89 or spout end 87 is generally aligned over a central zone 83, central region or target area or grip pattern 82 of the storage unit 93 or container 85 for unloading material from the transferring vehicle 91 to the receiving vehicle 79. Similarly, the transferring vehicle 91 and the receiving vehicle 79 are aligned in position as shown, and even as the vehicles 79, 91 move with coordinated headings or generally parallel headings and with no or minimal relative velocity with respect to each other.

In FIG. 5A, an optional second imaging device 12 may be mounted on the spout 87 of the transferring vehicle 91 with a second field of view 277, which may be slightly offset from, overlapped with, or aligned with the first field of view 477 to provide redundancy should the first imaging device 10 fail, malfunction, be unavailable, be unreliable, or provide poor quality image data. For example, the first imaging device 10 may not operate reliably where it is obscured by dust, fog, salt, or air-born contaminants, or where it is exposed to inadequate ambient light conditions or excessive glare from sunlight or reflected light. In FIG. 4A, the image processing module 18 can estimate the distance or range from the first imaging device 10, the second imaging device 12, or both to an object in the image, such as the spout 89, the spout end 87, the container perimeter 81, the level or profile of agricultural material in the container 85 (e.g., at various positions or coordinates within the container 85).

Figure 4B:
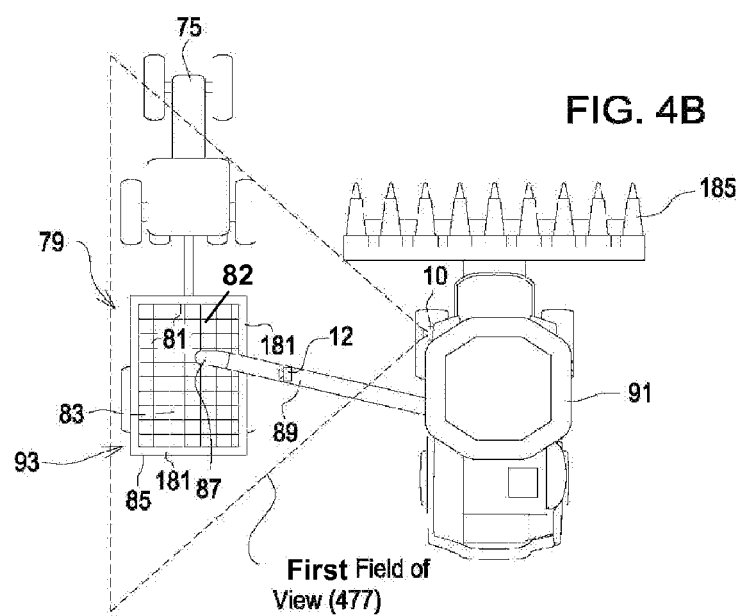
FIG. 4B illustrates a top view of imaging devices (e.g., a monocular or stereo vision system) mounted on a receiving vehicle and a transferring vehicle that face a storage portion of a receiving vehicle.

FIG. 4B illustrates a plan view of a transferring vehicle 91 and a receiving vehicle 79. Like reference numbers indicate like elements in FIG. 3, FIG. 4A and FIG. 4B. FIG. 4B shows a first imaging device 10 only on the body of the transferring vehicle 91. The first imaging device 10 has a first field of view 477 indicated by the dashed lines. In FIG. 4B, the spout 89 or spout end 87 is generally aligned over a central zone 83, central region or target area or grip pattern 82 of the storage unit 93 or container 85 for unloading material from the transferring vehicle 91 to the receiving vehicle 79. Similarly, the transferring vehicle 91 and the receiving vehicle 79 are aligned in position as shown, and even as the vehicles 79, 91 move with coordinated headings or uniform offset (e.g., Φ or φ; Δ).

Figure 4C:
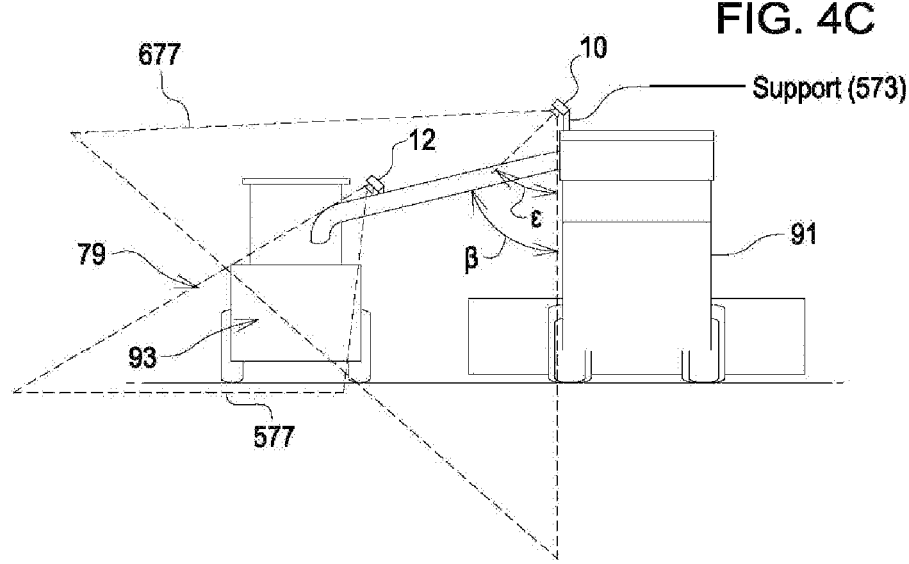
FIG. 4C illustrates a view in a horizontal plane as viewed along reference line 4C-4C in FIG. 4B.
Figure 4D:
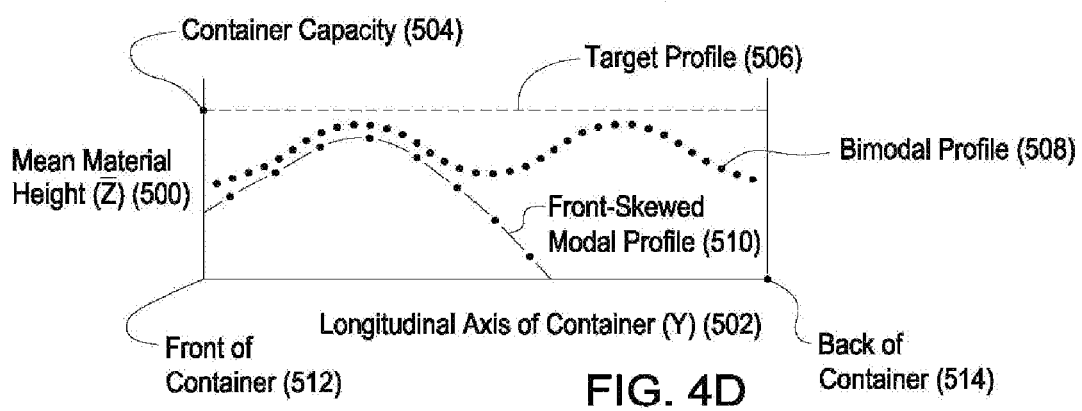
FIG. 4D illustrates a two-dimensional representation of various possible illustrative distributions of material in the interior of a container (or bin) or storage portion, consistent with a cross-sectional view along reference line 4D-4D in FIG. 4B.

FIG. 4C illustrates a view in a horizontal plane as viewed along reference line 4C-4C in FIG. 4B. In one embodiment, the first imaging device 10 is mounted on the transferring vehicle 91 on a support 573 (e.g., monopole with tilt or pan adjustment) to provide a downward field of view 677 or a down-tilted field of view.

In an alternate embodiment, the support 573 comprises an adjustable mast or telescopic mast that is controlled by a mast controller 674 to remotely adjust the height, tilt angle, down-tilt angle, rotation angle, or pan angle to provide reliable image data for processing by the image processing module 18.

If the first imaging device 10 is elevated or mounted on the transferring vehicle 91 sufficiently high with respect to the storage portion 93, the first imaging device 10 will have visibility or second downward field of view 677 into the storage portion 93 or container 85 sufficient to observe and profile the surface (or height (z) versus respective x, y coordinates in the container) of the agricultural material (e.g., grain) as the agricultural material fills the storage portion 85. The first imaging device 10 may be mounted on the roof of the transferring vehicle 91 facing or looking directly away from the side of the transferring vehicle 91 with the spout 89 for unloading agricultural material.

In one illustrative configuration, consistent with the downward field of view 677 the optical axis, perpendicular to respective lens, of the first imaging device 10 is tilted downward from generally horizontal plane at a down-tilted angle (ε) (e.g., approximately 10 to 25 degrees downward). If a field of view or optical axis of the imaging device 10 is tilted downward from a generally horizontal plane, there are several advantages. First, less of the sky is visible in the field of view of the imaging device 10 such the collected image data tends to have a more uniform image intensity profile. The tilted configuration of the optical axis or axes (which is perpendicular to the lens of the imaging device 10) is well suited for mitigating the potential dynamic range issues caused by bright sunlight or intermediate cloud cover, for instance. Second, the bottom part of the storage portion 93 becomes more visible in the image data to enable the recording of the image data related to one or more wheels of the storage portion 93. The wheel is a feature on the storage portion 93 that can be robustly tracked by image processing techniques. Third, tilting the stereo camera down may mitigate the accumulation of dust and other debris on the lens or external window of the imaging device 10, 12.

FIG. 4D illustrates a two-dimensional representation of various possible illustrative distributions of material in the container 85, consistent with a view along reference line 4D in FIG. 4B. In one configuration, the y axis is coincident with the longitudinal axis or direction of travel of the container, the z axis is coincident with the height of material in the container, and the x axis is perpendicular to the direction of travel of the container, where the x, y and z axes are generally mutually orthogonal to each other.

In the chart of FIG. 5D, the vertical axis is the mean height (Z) 500 of the material in the container 85, the horizontal axis represents the longitudinal axis (y) 502 of the container 85. The maximum capacity 504 or container capacity is indicated by the dashed line on the vertical axis. The front 512 of the container 85 is located at the origin, whereas the back 514 of the container 85 is located on the vertical axis.

FIG. 4D shows three illustrative distributions of material within the container 85. The first distribution is a bimodal profile 508 in which there are two main peaks in the distribution of material in the container 85. The bimodal profile 508 is shown as a dotted line. The bimodal profile 508 can occur where the spout angle adjustment is governed by an electro-hydraulic system with non-proportional valves.

The second distribution is the front-skewed modal profile 510 in which there is single peak of material toward the front of the container 85. The front-skewed modal profile 510 is shown as alternating long and short dashes. The second distribution may occur where the volume or length (y) of the container 85 is greater than a minimum threshold and where the relative alignment between the spout end 87 and the container 85 is generally stationary during a substantial portion of unloading of the material.

The third distribution is the target profile 508 which may be achieved by following a suitable fill strategy as disclosed in this document. For example, during unloading, the spout angle may be adjusted to promote uniform distribution of the agricultural material in the container 85. Further, the lateral offset (Δ) or fore/aft offset (Φ or φ) between the vehicles 79, 91 may be adjusted in accordance with a matrix (e.g., x, y coordinate matrix of equidistant point locations of the transferring vehicle relative to a constantly spaced position point of the receiving vehicle) of relative unloading positions, particularly for longer or wider containers that cannot be uniformly filled from a single, relative unloading point between the vehicles 79, 91.

Figure 4E:
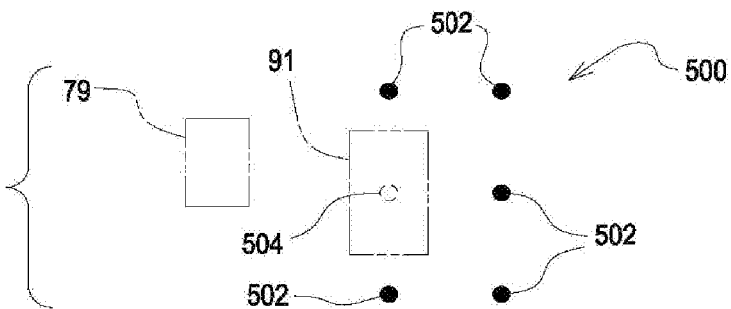
FIG. 4E is a top view of a transferring vehicle and a receiving vehicle, where the transferring vehicle is aligned within a matrix of possible offset positions.

FIG. 4E is a top view of a transferring vehicle 91 and a receiving vehicle 79, where the transferring vehicle 91 is aligned within a matrix 500 of possible offset positions 502, 504 between the transferring vehicle 91 and receiving vehicle 79. Each offset position 502, 504 may be defined in terms of a combination of a unique lateral offset (Δ) and a unique fore/aft offset (Φ or φ) between the vehicles 79, 91. As shown, the matrix 500 is a two-dimensional, 2×3 (2 columns by 3 rows) matrix of possible offset positions 502, 504. Although six possible matrix positions 502, 504 are shown, in alternate embodiments the matrix 500 may consistent of any number of possible offset positions greater than or equal to two. Here, the transferring vehicle 91 occupies a current offset position 504 in the first column at the second row of the matrix 500, whereas the other possible offset positions 502 are not occupied by the transferring vehicle 91. As directed by any of the systems 11, 111, the imaging processing module 18, or the master controller 59 of the transferring vehicle 91 can shift to any unoccupied or other possible offset positions 502 within the matrix 500 to promote or facilitate an even distribution of agricultural material within the container 85 or storage portion of the receiving vehicle 79. The spatial offset between the transferring vehicle 91 and the receiving vehicle 79 may be adjusted in accordance with the matrix 500 or another matrix of preset positions of spatial offset to promote even distribution of agricultural material in the storage portion of the receiving vehicle 79, where any matrix is associated with a unique, relative lateral offset (Δ) and a unique fore/aft offset (Φ or φ) between the vehicles 79, 91.

In one embodiment of FIG. 4E, both the transferring vehicle 91 and the receiving vehicle 79 may be moving forward at approximately the same velocity and heading (e.g., within a tolerance or error of the control systems during harvesting), where the relative position of the receiving vehicle 79 is generally fixed or constant with respect to each position 502, 504 in the matrix 500 that the transferring vehicle 91 can occupy.

In an alternate embodiment, the receiving vehicle 79 may be shown as occupying a two dimensional matrix (e.g., 3×3 matrix, with three columns and three rows) of possible offset positions, while the position of the transferring vehicle 91 is generally fixed or constant with respect to each position of matrix that the receiving vehicle 79 could occupy. As directed by any of the systems 11, 111 in the alternate embodiment, the imaging processing module 18 can shift to any unoccupied or other possible offset positions within the matrix to promote or facilitate an even distribution of agricultural material within the container 85 or storage portion 93 of the receiving vehicle 79.

In FIGS. 5A, 5B, 6A, and 6B, each of the blocks or modules may represent software modules, electronic modules, or both. Software modules may contain software instructions, subroutines, object-oriented code, or other software content. The arrows that interconnect the blocks or modules of FIG. 6 show the flow of data or information between the blocks. The arrows may represent physical communication paths or virtual communication paths, or both. Physical communication paths mean transmission lines or one or more data buses for transmitting, receiving or communicating data. Virtual communication paths mean communication of data, software or data messages between modules.

Figure 5B:
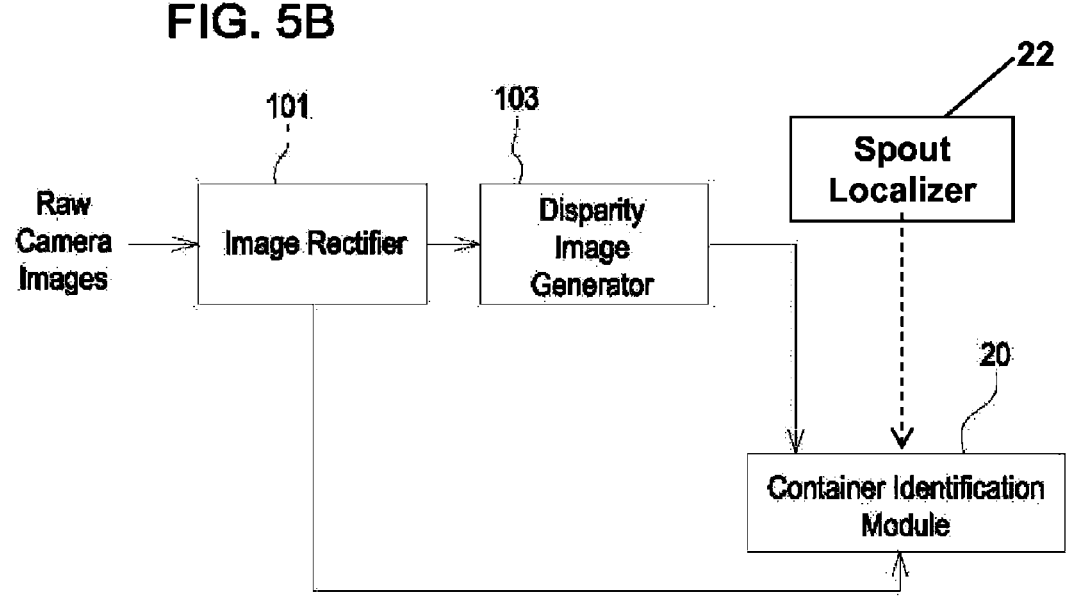
FIG. 5B illustrates a block diagram of a container identification process capable of using rectified images and disparity images.

As illustrated in FIGS. 1 and 2, the first imaging device 10, the second imaging device 12, or both, provide input of raw stereo camera images (or raw image data) to the image rectification module 101. FIG. 5A is a block diagram that shows raw camera (monocular or stereo) processed by image rectifier 101 to create rectified images for input into container identification module 20. Optional input into container identification module 20 is spout localizer data 22, discussed in detail below. FIG. 5B is a block diagram that shows raw camera images (monocular or stereo) processed by image rectifier 101 to create a rectified image. The rectified image will be processed by the disparity image generator 103 to create ranges in the form of disparity data. Thereafter, rectified images and disparity data are process by the spout localizer 22 with spout position data 1002. Output from spout localizer 22 is input into container identification module 20. In an alternative embodiment, data from spout localizer 22 can be input into container identification module 20 for a refinement in the material distribution in container or bin 85. Like reference numbers in FIGS. 1, 2, 5A, 6A, and 6B indicate like elements.

Figure 6A:
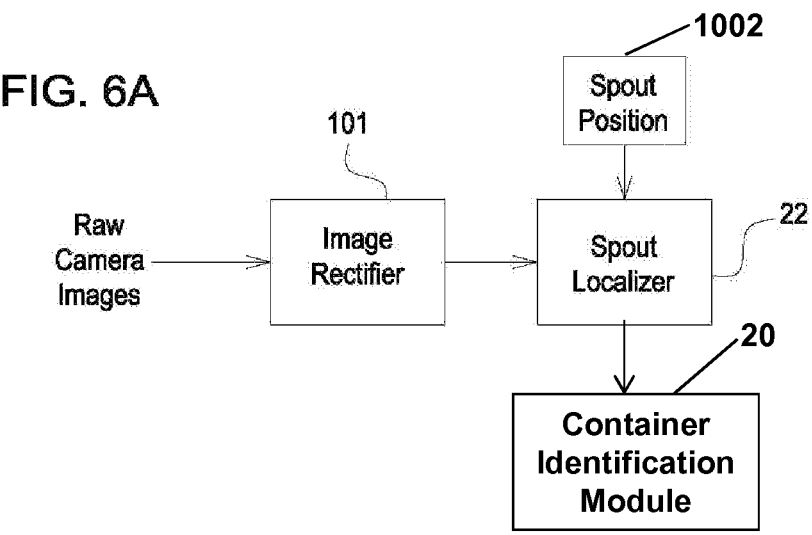
FIG. 6A is a block diagram of a spout localizing process using rectified images and spout position data.

FIG. 6A is a block diagram that shows raw camera images (monocular or stereo) processed by an image rectifier 101 to create rectified images for input into spout localizer 22 for further processing with spout position data 1002 provided by vehicle model 1000. Output data from spout localizer 22 can be input data for container identification module 20.

Figure 6B:
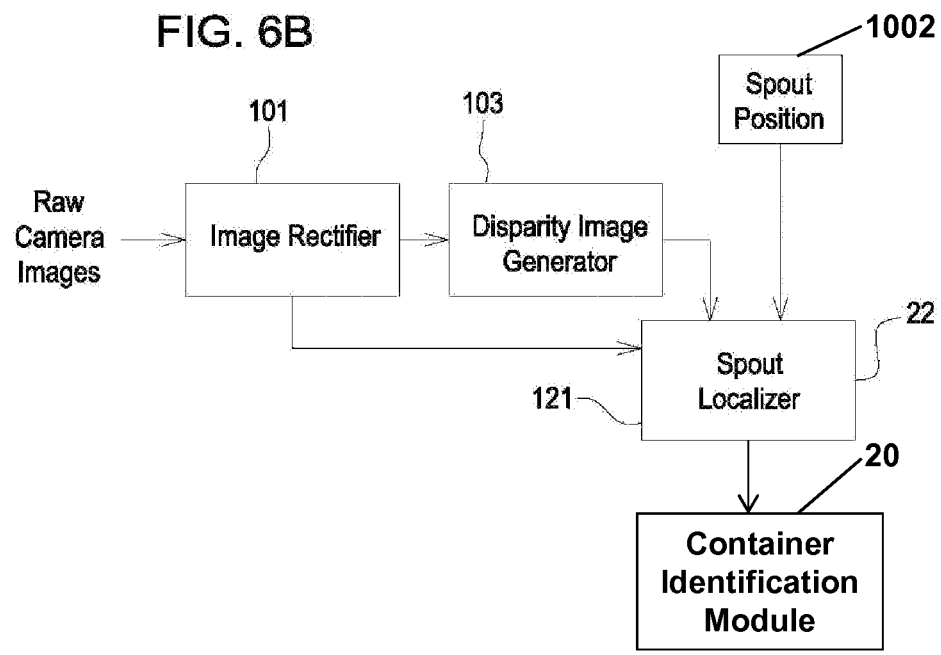
FIG. 6B is a block diagram of a spout localizing process using rectified images, disparity images, and spout position data.

FIG. 6B is a block diagram that shows raw camera images (monocular or stereo) processed by an image rectifier 101 to create rectified images. The rectified images will be processed by disparity generator 103 to create ranges in the form of disparity data. Thereafter, rectified images and disparity data are processed by the spout localizer 22 along with spout position data 1002. The output data of spout localizer 22 can be further processed by the container identification module 20. The image rectification module 101 provides image processing to the collected image data or raw stereo images to reduce or remove radial lens distortion and image alignment required for stereo correspondence. The radial lens distortion is associated with the radial lenses of the first imaging device 10, the second imaging device 12, or both. The input of the image rectification module 101 is raw stereo image data, whereas the output of the image rectification module 101 is rectified stereo image data.

In one illustrative embodiment, the image rectifier 101 eliminates or reduces any vertical offset or differential between a pair of stereo images of the same scene of the image data. Further, the image rectification module can align the horizontal component (or horizontal lines of pixels of the stereo images) to be parallel to the scan lines or common reference axis of each imaging device (e.g., left and right imaging device) within the first and second imaging devices 10, 12. For example, the image rectifier 101 can remap pixels from initial coordinates to revised coordinates for the right image, left image or both to achieve registration of the images or rectified right and left images of the stereo image. The rectified image supports efficient processing and ready identification of corresponding pixels or objects within the image in the left image and right image of a common scene for subsequent image processing.

In one configuration, the disparity image generator 103 applies a stereo matching algorithm or disparity calculator to collected stereo image data, such as the rectified stereo image data outputted by the image rectifier 101. The stereo matching algorithm or disparity calculator may comprise a sum of absolute differences algorithm, a sum of squared differences algorithm, a consensus algorithm, or another algorithm to determine the difference or disparity for each set of corresponding pixels in the right and left image (e.g., along a horizontal axis of the images or parallel thereto).

In an illustrative sum of the absolute differences procedure, the right and left images (or blocks of image data or rows in image data) can be shifted to align corresponding pixels in the right and left image. The stereo matching algorithm or disparity calculator determines a disparity value between corresponding pixels in the left and right images of the image data. For instance, to estimate the disparity value, each first pixel intensity value of a first subject pixel and a first sum of the first surrounding pixel intensity values (e.g., in a block or matrix of pixels) around the first pixel is compared to each corresponding second pixel intensity value of second subject pixel and a second sum of the second surrounding pixel intensity values (e.g., in a block or matrix of pixels) around the second pixel. The disparity values can be used to form a disparity map or image for the corresponding right and left image data.

A container localizer estimates a distance or range from the first imaging device 10, the second imaging device 12, or both to the pixels or points lying on the container perimeter 81, on the container edge 181, on the spout 89, on the spout end 87, or on any other linear edge, curve, ellipse, circle or object identified by the edge detector, the linear Hough transformer, or both. For example, the image processing module 18 may use the disparity map or image to estimate a distance or range from the first imaging device 10, the second imaging device 12, or both to the pixels or points lying on the container perimeter 81, the container edges 181, the container opening 83, in the vicinity of any of the foregoing items, or elsewhere.

In one embodiment, the container identification module 20 comprises: (1) an edge detector for measuring the strength or reliability of one or more edges 181, or points on the container perimeter 81 in the image data; (2) a linear Hough transformer for identifying an angle and offset of candidate linear segments in the image data with respect to a reference point on an optical axis, reference axis of the one or more imaging devices 10, 12; (3) a container localizer adapted to use spatial and angular constraints to eliminate candidate linear segments that cannot logically or possibly form part of the identified linear segments of the container perimeter 81, or points on the container perimeter 81; and (4) the container localizer transforms the non-eliminated, identified linear segments, or identified points, into two or three dimensional coordinates relative to a reference point or reference frame of the receiving vehicle and harvesting vehicle.

The edge detector may apply an edge detection algorithm to rectified image data from the image rectifier 101. Any number of suitable edge detection algorithms can be used by the edge detector. Edge detection refers to the process of identifying and locating discontinuities between pixels in an image or collected image data. For example, the discontinuities may represent material changes in pixel intensity or pixel color which defines boundaries of objects in an image. A gradient technique of edge detection may be implemented by filtering image data to return different pixel values in first regions of greater discontinuities or gradients than in second regions with lesser discontinuities or gradients. For example, the gradient technique detects the edges of an object by estimating the maximum and minimum of the first derivative of the pixel intensity of the image data. The Laplacian technique detects the edges of an object in an image by searching for zero crossings in the second derivative of the pixel intensity image. Further examples of suitable edge detection algorithms include, but are not limited to, Roberts, Sobel, and Canny, as are known to those of ordinary skill in the art. The edge detector may provide a numerical output, signal output, or symbol, indicative of the strength or reliability of the edges 181 in field. For example, the edge detector may provide a numerical value or edge strength indicator within a range or scale or relative strength or reliability to the linear Hough transformer.

The linear Hough transformer receives edge data (e.g., an edge strength indicator) related to the receiving vehicle and identifies the estimated angle and offset of the strong line segments, curved segments or generally linear edges (e.g., of the container 85, the spout 89, the spout end 87 and opening 83) in the image data. The estimated angle is associated with the angle or compound angle (e.g., multidimensional angle) from a linear axis that intercepts the lenses of the first imaging device 10, the second image device 12, or both. The linear Hough transformer comprises a feature extractor for identifying line segments of objects with certain shapes from the image data. For example, the linear Hough transformer identifies line equation parameters or ellipse equation parameters of objects in the image data from the edge data outputted by the edge detector, or Hough transformer classifies the edge data as a line segment, an ellipse, or a circle. Thus, it is possible to detect containers or spouts with generally linear, rectangular, elliptical or circular features.

In one embodiment, the data manager supports entry or selection of container reference data by the user interface 44. The data manager supports entry, retrieval, and storage of container reference data, such as measurements of cart dimensions, by the image processing module 18 to give spatial constraints to the container localizer on the line segments or data points that are potential edges 181 of the cart opening 83.

In one embodiment, the angle estimator may comprise a Kalman filter or an extended Kalman filter. The angle estimator estimates the angle of the storage portion 93 (e.g., cart) of the receiving vehicle 79 to the axis of the direction of travel of the propelled portion 75 (e.g., tractor) of the receiving vehicle 79. The angle estimator (e.g., Kalman filter) provides angular constraints to the container localizer on the lines, or data points, that are potential edges 181 of the container opening 83. In configuration, the angle estimator or Kalman filter is coupled to the container localizer. The angle estimator filter outputs, or is capable of providing, the received estimated angle of the storage portion 93 relative to the axis of the direction of travel of the propelling portion 75 of the vehicle.

The container localizer is adapted to receive measurements of dimensions of the container perimeter 81 or the storage portion 93 of the vehicle to facilitate identification of candidate linear segments that qualify as identified linear segments of the container perimeter 81. In one embodiment, the container localizer is adapted to receive an estimated angle of the storage portion 93 relative to the propelling portion 75 of the vehicle to facilitate identification of candidate linear segments that qualify as identified linear segments of the container perimeter 81. The container localizer uses spatial and angular constraints to eliminate candidate lines in the image data that cannot be possibly or logically part of the container opening 83 or container edges 181, then selects preferential lines (or data points on the container edge 81) as the most likely candidates for valid container opening 83 (material therein) or container edges 181. The container localizer characterizes the preferential lines as, or transformed them into, three dimensional coordinates relative to the vehicle or another frame of reference to represent a container perimeter of the container 85.

In one embodiment, the spout localizer 22 comprises a spout classifier that is configured to identify candidate pixels in the image data based at least one of reflectivity, intensity, color or texture features of the image data (or pixels), of the rectified image data or raw image data, where the candidate pixels represent a portion of the spout 89 or spout end 87. The spout localizer 22 is adapted to estimate a relative position of the spout 89 to the imaging device based on the classified, identified candidate pixels of a portion of the spout 89. The spout localizer 22 receives an estimated combine spout position or spout angle ($\alpha$) relative to the mounting location of the imaging device, or optical axis, or reference axis of one or more imaging devices, based on previous measurements to provide constraint data on where the spout 89 can be located possibly.

The spout classifier applies or includes software instructions on an algorithm that identifies candidate pixels that are likely part of the spout 89 or spout end 87 based on expected color and texture features within the processed or raw image data. For example, in one configuration the spout end 87 may be painted, coated, labeled or marked with a coating or pattern of greater optical or infra-red reflectivity, intensity, or luminance than a remaining portion of the spout 89 or the transferring vehicle. The greater luminance, intensity or reflectivity of the spout end 87 (or associated spout pixels of the image data versus background pixels) may be attained by painting or coating the spout end 87 with white, yellow, chrome or a lighter hue or shade with respect to the remainder of the spout 89 or portions of the transferring vehicle within the field of view of the imaging devices 10, 12.

In one embodiment, the spout position estimator comprises a Kalman filter or an extended Kalman filter that receives input of previous measurements and container reference data and outputs an estimate of the spout position, spout angle, or its associated error. The spout position estimator provides an estimate of the combine spout position, or spout angle, or its error, relative to one or more of the following: (1) the mounting location or pivot point of the spout on the transferring vehicle, or (2) the optical axis or other reference axis or point of the first imaging device 10, the second imaging device 12, or both, or (3) the axis associated with the forward direction of travel or the heading of the transferring vehicle. The Kalman filter outputs constraints on where the spout 89 or spout end 87 can be located, an estimated spout position, or a spout location zone or estimated spout position zone. In one embodiment, the spout position estimator or Kalman filter is coupled to the spout localizer 22.

The spout localizer 22 takes pixels that are classified as belonging to the combine auger spout 89 and uses a disparity image from disparity image generator 103 to estimate the relative location of the spout to the first imaging device 10, the second imaging device 12, or both, or reference axis or coordinate system associated with the vehicle.

Figure 7:
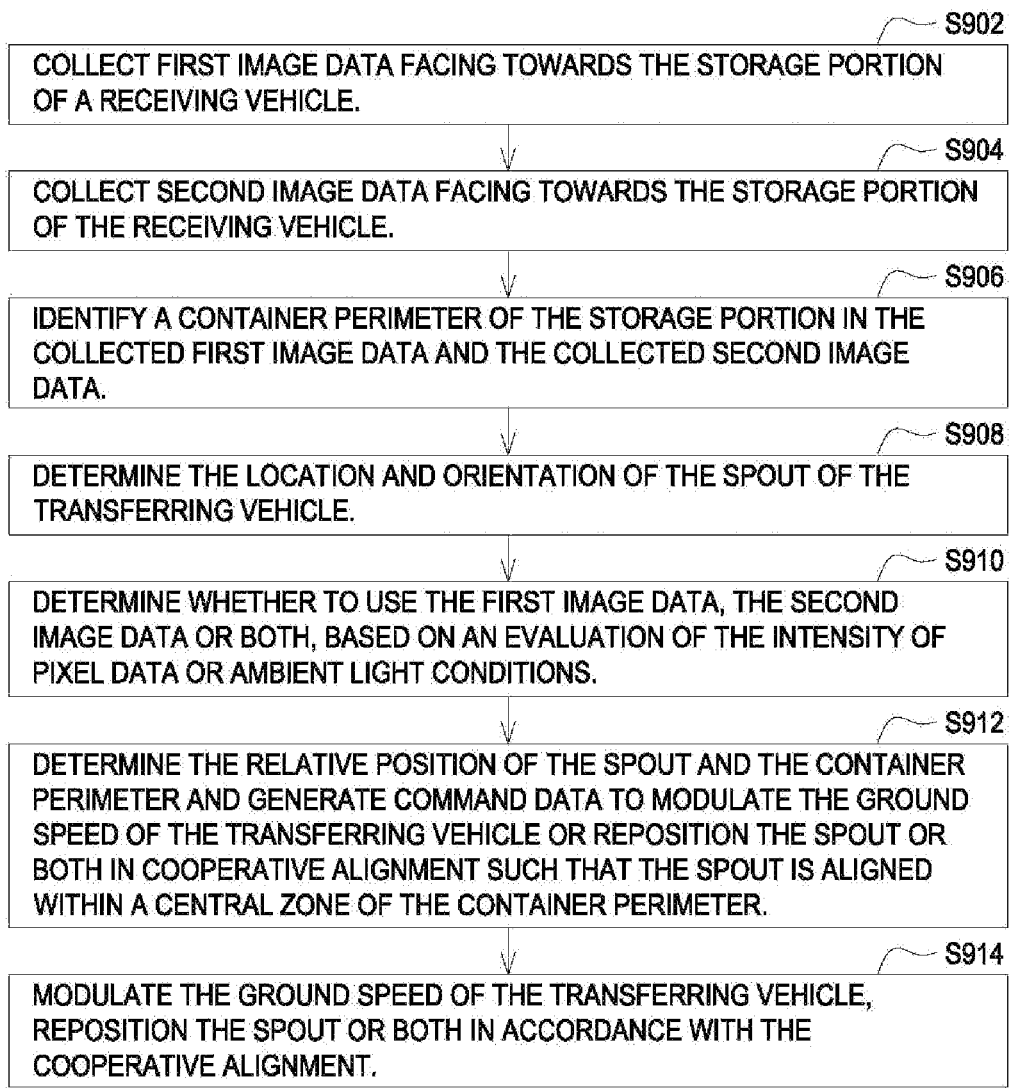
FIG. 7 is a flow chart of a method for operating a machine vision-augmented guidance system for facilitating the unloading of agricultural material from a transferring vehicle.

FIG. 7 is a flow chart of a method for facilitating the unloading of agricultural material from a vehicle or between a transferring vehicle 91 and a receiving vehicle 79. The method of FIG. 7 may use one or more of the following embodiments of the systems 11, 111 previously disclosed herein.

In step S902, the first imaging device 10 faces toward the storage portion of the receiving vehicle 79 (e.g., grain cart) and collects first image data (e.g., first stereo image data, first monocular image data, or a right image of a stereo image). For example, the first imaging device 10 may be mounted on the body of transferring vehicle 91 facing the receiving vehicle 79 and facing the container 85. In one embodiment, the first imaging device 10 has first field of view 77 (FIG. 3) or view 477 (FIGS. 4A and 4B) of the storage portion of the receiving vehicle 79.

In an alternative embodiment, the first imaging device 10 comprises a monocular imaging device that provides a first image section (e.g., left image) of stereo image data of a scene or an object.

In step S904, where present, the optional second imaging device 12 faces toward the storage portion 93 of the receiving vehicle 79 (e.g., grain cart) and collects second image data (e.g., second stereo image data, second monocular image data, or a left image of a stereo image). For example, the second imaging device 12 may be mounted on spout 89 of the transferring vehicle 91 facing the receiving vehicle 79 (FIGS. 3 and 4A). In one embodiment, the second imaging device 12 has a second field of view (177, 277) of the storage portion of the receiving vehicle, where the first field of view (77, 477) overlaps at least partially with the second field of view (177, 277, respectively.

In an alternate embodiment, the second imaging device 12 comprises a monocular imaging device that provides a second image section (e.g., right image) of stereo image data of a scene or an object, where the image processing module 18 supports the creation of a stereo image from a combination of the first image section (of the first monocular imaging device) and the second image section with reference to the relative position and orientation of the first imaging device 10 and the second imaging device 12.

In step S906, an image processing module 18 or a container identification module 20 identifies a container perimeter 81 of the storage portion 93 in the collected image data (e.g., the first image data, the second image data or both), where the storage portion 93 has an opening 83 inward from the container perimeter 81 for receipt of the agricultural material. Step S906 may be carried out in accordance with various techniques, which may be applied alternately or cumulatively. Under a first technique, the image processing module 18 or container identification module 20 may employ the following processes or sub-steps: (1) measuring a strength of one or more edges 181 in the image data (raw and rectified image data); (2) identifying an angle and offset of candidate linear segments in the image data with respect to an optical axis, reference axis (e.g., direction of travel of the transferring vehicle), or reference point indexed to one or more imaging devices 10, 12; and (3) using spatial and angular constraints to eliminate identified candidate linear segments that cannot logically or possibly form part of the identified linear segments of the container perimeter, where the container identification module transforms the identified linear segments into three dimensional coordinates relative to a reference point or reference frame of the receiving vehicle and/or the harvesting vehicle.

Under a second technique, the image processing module 18 or container identification module 20 may receive container reference data, or measurements of dimensions of the container perimeter 81 or the storage portion 93 of the vehicle, to facilitate identification of candidate linear segments, or candidate data points, that qualify as identified linear segments of the container perimeter 81.

Under the third technique, the image processing module 18 or container identification module 20 may receive an estimated angle of the storage portion 93 relative to the propelling portion 75 of the vehicle to facilitate identification of candidate linear segments that qualify as identified linear segments of the container perimeter 81.

Under a fourth technique, the image processing module 18 or container identification module 20 provides the received estimated angle of the storage portion 93 relative to the propelling portion 75 of the vehicle.

In step S908, the image processing module 18 or a spout localizer 22 identifies a spout 89 (or spout end 87) of the transferring vehicle 91 in the collected image data. The image processing module 18 or the spout localizer 22 may use various techniques, which may be applied alternately or cumulatively. Under a first technique, the image processing module 18 or the spout localizer 22 identifies candidate pixels in the image data (e.g., rectified or raw image data) based on expected color and expected texture features of the image data, where the candidate pixels represent a portion of the spout 89 (e.g., combine auger spout) or spout end 87.

Under a second technique, the image processing module 18 or the spout identification module 22 estimates a relative position, or relative angle, of the spout 89 or the spout end 87, to the imaging device based on the classified, identified candidate pixels of a portion of the spout 89.

Under a third technique, the image processing module 18 or the spout identification module 22 receives an estimated combine spout position, or spout angle, relative to the mounting location, optical axis, reference axis, or reference point of the imaging device 10, 12 based on previous measurements to provide constraint data on where the spout 89 can be located possibly.

Under a fourth technique, the image processing module 18 or spout localizer 22 provides the estimated combine spout position, or estimated spout angle, to the container identification module 20.

In step S910, the image data evaluator 25 or image processing module 18 determines whether to use the first image data, the second image data or both, based on an evaluation of the intensity of pixel data or ambient light conditions. Step S910 may be carried out in accordance with various techniques, which may be applied alternately or cumulatively.

Under a first technique, where a first optical sensor 110 is associated with the respective first imaging device 10; the image data evaluator 25 or image processing module 18 decides to use the first image data if the variation in ambient light over a sampling time interval (e.g., commensurate with a sampling rate of 1 to 120 samples per second) is less than or equal to a maximum ambient light variation, as measured by the first optical sensor 110. Here, under the first technique the first image data is collected solely by the first imaging device 10. A background level, mean level, or mode level of variation in the ambient light in the image data, a block of pixels in the first image data, or an object within the image data (e.g., spout, spout end, container perimeter or container) may be gathered or tracked during operation or normal operation of the systems 11, 111. In one embodiment, the maximum ambient light level is set to be greater than the background level, mean level, or mode level. For example, the maximum ambient light level (e.g., within the visible light spectrum, near-infrared spectrum, or infrared spectrum) is set to be greater by statistical measure (e.g., approximately one to two standard deviations above the background level), mean level or mode level, or a signal level difference between the maximum ambient light level and the mean level of equal to or greater than a threshold level (e.g., within a range of approximately 3 decibels to 6 decibels).

Under a second technique, where a second optical sensor 112 is associated with the second imaging device 12; the image data evaluator 25 or image processing module 18 decides to use the second image data if the variation in ambient light over a sampling time interval (e.g., commensurate with a sampling rate of 1 to 120 samples per second) is less than or equal to a maximum ambient light variation, as measured by the second optical sensor 112. Here under the second technique, the second image data is collected solely by the second imaging device 12. A background level, mean level, or mode level of variation in the ambient light in the second image data, a block of pixels in the image data, or an object within the image data (e.g., spout, spout end, container perimeter or container) may be gathered or tracked during operation or normal operation of the systems 11, 111. In one embodiment, the maximum ambient light level is set to be greater than the background level, mean level, or mode level. For example, the maximum ambient light level (e.g., within the visible light spectrum, near-infrared spectrum, or infrared spectrum) is set to be greater by statistical measure (e.g., approximately one to two standard deviations above the background level), mean level or mode level, or a signal level difference between the maximum ambient light level and the mean level of equal to or greater than a threshold level (e.g., within a range of approximately 3 decibels to 6 decibels).

Under a third technique, the image processing module 18, or the image data evaluator 25 decides to use the first image data of the first imaging device 10 if the variation in pixel intensity of a spout, a spout end, or a container in the first image over a sampling time interval is less than or equal to a maximum pixel intensity variation, as detected by the image processing module 18.

Under a fourth technique, the image processing module 18, or the image data evaluator 25 decides to use the second image data of the second imaging device 12 if the variation in pixel intensity of a spout or spout end in the second image over a sampling time interval is less than or equal to a maximum pixel intensity variation, as detected by the image processing module 18.

Under a fifth technique, the image processing module 18, the image data evaluator 25 is adapted for determining whether to use the first image data, the second image data or both, for the identification of the container perimeter and the identifying of the spout (or spout end), based on pixel intensity in rejected image data being outside of a desired range or variation in pixel intensity during the sampling time interval, where the image processing module 18, the image data evaluator 25 or image processing module 18 is configured to disable selectively the processing or use of the rejected image data that comprises a portion of the collected first image data or the second image data that would otherwise be corrupted by one or more of the following conditions: (1) excessive transient sunlight during sunrise, sunset, or excessive light radiation from other sources (e.g., headlights from other vehicles), (2) transitory sunlight or cloud cover, (3) fog, precipitation or moisture, (4) shading (e.g., from vegetation, trees, buildings or plant canopies), (5) airborne dust or debris, (6) reflections of light (e.g., from polished, glossy or reflective surfaces of other machines or vehicles) or other lighting conditions that can temporarily disrupt or interfere with proper operation of the imaging devices 10, 12.

In step S912, the image processing module 18 or the alignment module 24 determines the relative position of the spout 89, or the spout end 87, and the container perimeter 81 and for generating command data to modulate the ground speed of the transferring vehicle 91 or reposition the spout 89 or both in cooperative alignment such that the spout 89 (or spout end 87) is aligned with a central zone 83 of the container perimeter 81. The image processing module 18 may use, retrieve or access previously stored data, such as dimensional parameters related to the receiving vehicle, the dimensional parameters comprising a distance between a trailer hitch and front wheel rotational axis of the storage portion 93. Such dimensional parameters may be entered via a user interface 44 coupled to the vehicle data bus 60 or the image processing module 18, for example.

To execute step S912, the imaging processing module 18 may use first location data of a first location determining receiver 42 on the transferring vehicle 91 to determine relative position between the spout and the container perimeter, and generate command data to modulate the ground speed of the transferring vehicle 91 or reposition the spout 89 or both in cooperative alignment such that the spout 89 is aligned within a central zone of the container perimeter 181 or a section of grid pattern 82.

In step S914, in a first configuration, the controller 59 or the propulsion controller 40 modulates the ground speed of the transferring vehicle 91. In a second configuration, the vehicle controller 46 or the spout controller 54 repositions the spout 89. The rotation actuator 122 (e.g., a servo-motor, electric motor, linear motor and linear-to-rotational gear assembly, or electro-hydraulic device) controls the spout angle of the spout 89, or the spout end 87, with respect to the direct of travel or another reference axis of the transferring vehicle in response to alignment module 24 or the image processing module 18 (e.g., smart unloading controller). In a third configuration, both the speed of the transferring vehicle and the spout 89 is repositioned.

Figure 8:
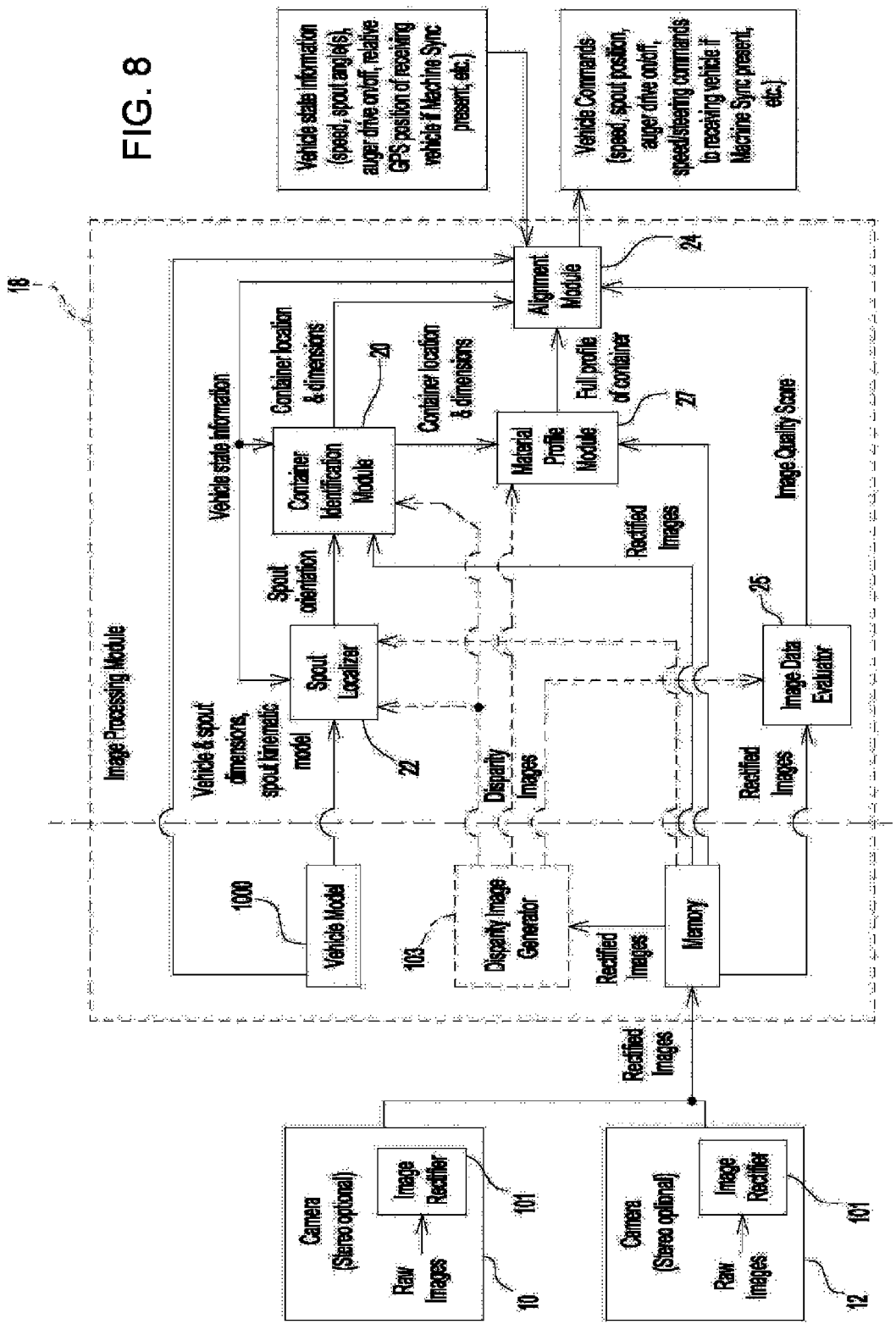
FIG. 8 is a schematic illustrating the data flow and processing by the image processing module from raw images to vehicle commands.

FIG. 8 illustrates the data flow and processing by the image processing module 18 from the raw images to the transferring vehicle commands. The components and modules have been discussed in detail above. The dashed lines represent optional steps and/or modules. Raw images are collected by the imaging device 10, 12 (e.g. camera being either stereo or monocular). Some embodiments of the present invention only require one imaging device. Raw images are processed through the image rectifier 101 to create rectified images. Rectified images are processed by the image data evaluator 25 to provide an image quality score for the rectified image to determine if the image should be used in further processing by the alignment module 24. Rectified images are also processed by the container identification module 20 and material profile module 27. Rectified images can also be processed in conjunction with disparity images by the spout localizer 22 when a disparity image generator 103 is present. Otherwise, spout localizer 22 will only use the data stored in vehicle model 1000, which includes, but not limited to, data on the transferring vehicle 91, dimensions of spout 89, and spout kinematic model. Spout localizer 22 also requires data about the vehicle state information, which includes, but not limited to, transferring vehicle speed, spout angle(s), auger drive on/off status, and relative Global Positioning Satellite position of receiving vehicle 79 if machine synchronization is present. Spout localizer 22 output is input into container identification module 20 and processed in conjunction with rectified images and disparity images (if provided) by container identification module 20 to determine container location and dimensions. Rectified images and disparity images (if provided) are processed in conjunction with container location and dimensions data from container identification module 20 by material profile module 27 to generate a fill profile of the container 85. Alignment module 24 processes data generated by the container identification module 20, material profile module 27 in conjunction with the vehicle state information to generate vehicle commands such as transferring vehicle 91 speed/steering, spout position, auger drive on/off status, and speed/steering of the receiving vehicle 79 if machine synchronization is present to reposition the spout end 87 over the appropriate open area of the container 85 for even, uniform distribution of the agricultural material in container 85.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

The invention claimed is:

1. A method for facilitating the transfer of material from a transferring vehicle having a material distribution end to a receiving vehicle having a bin to store the transferred material, the method comprising the steps of:
   a. obtaining image data from at least one imaging device facing the bin, wherein the at least one imaging device is mounted on the transferring vehicle;
   b. identifying and locating the bin from the image data using an image processing module;

c. identifying a spout from the image data using the image processing module to determining a location and orientation of the spout;
d. detecting a representation of the fill level or volumetric distribution of the material in the bin;
e. determining a position of the spout relative to the bin using an alignment module based on an identified location of the bin and the identified location and orientation of the spout;
f. aligning the spout over a current target area of the bin requiring the material by generating command data used by at least one of a vehicle controller and a spout controller,
   wherein the command data is based in part on the position of the spout relative to the bin;
g. determining subsequent target areas of the bin that require material based on the representation of the fill level or volumetric distribution of the material in the bin;
h. transferring the material from the transferring vehicle to the current target area of the bin of the receiving vehicle;
i. detecting when the current target area of the bin is filled with the material;
j. repeating steps f-i until the subsequent target areas of the bin are filled; and
k. terminating the transfer of the material from the transferring vehicle to the receiving vehicle.

2. The method according to claim 1, wherein the representation of the fill level or volumetric distribution of the material in the bin is one-dimensional.

3. The method according to claim 1, wherein the representation of the fill level or volumetric distribution of the material in the bin is two-dimensional.

4. The method according to claim 1, wherein the representation of the fill level or volumetric distribution of the material in the bin is three-dimensional.

5. The method according to claim 1, wherein the step of detecting the representation of the fill level or volumetric distribution of the material in the bin further comprises the steps of:
   receiving data from a distributed fill state sensor; and
   generating the representation of the fill level or volumetric distribution of the material in the bin based on the distributed fill state sensor.

6. The method according to claim 1, wherein the material is agricultural material.

7. The method according to claim 1, wherein the material is a mineral material.

8. The method according to claim 1, wherein the step of detecting the representation of the fill level or volumetric distribution of the material in the bin further comprises the steps of:
   receiving rectified image data from the at least one imaging device;
   generating disparity image data based on the rectified image data; and
   generating the representation of the fill level or volumetric distribution of the material in the bin using range data based on the disparity image data.

9. The method according to claim 8, wherein the step of receiving rectified image data from one or more imaging devices further comprises receiving a rectified image data from an imaging device on the transferring vehicle, wherein there are no imaging devices on the receiving vehicle.

10. The method according to claim 8, wherein the step of receiving rectified image data from the at least one imaging device further comprises:
    receiving a first rectified image data from a first imaging device on the transferring vehicle; and
    receiving a second rectified image data from a second imaging device on the transferring vehicle,
    wherein there are no imaging devices on the receiving vehicle.

11. The method according to claim 1, wherein the step of determining subsequent target areas of the bin that require material based on the representation of the fill level or volumetric distribution of the material in the bin comprises the steps of:
    developing a target zone matrix of the bin, wherein each target zone of the matrix is identified by a pre-established set of coordinates related to the bin;
    identifying target zones of the matrix that are filled and not filled based on the representation of the fill level or volumetric distribution of the material in the bin; and
    determining the pre-established set of coordinates of a subsequent target zone to be filled and the pre-established set of coordinates of the current target zone over which the material distribution end is positioned.

12. The method according to claim 11, wherein the step of aligning the spout over a current target area of the bin requiring the material comprises the step of actuating a control mechanism to move the spout over the pre-established set of coordinates of a subsequent target zone to be filled.

13. The method according to claim 12, wherein the step of actuating a control mechanism to move the spout over the pre-established set of coordinates of a subsequent target zone to be filled comprises the steps of:
    establishing a current lateral spout angle of the spout;
    converting the pre-established set of coordinates between the current target zone and the subsequent target zone to be filled into a change in the current lateral spout angle to form a new lateral spout angle;
    transmitting the new lateral spout angle to a spout controller of the transferring vehicle; and
    actuating the spout controller from the current lateral spout angle to the new lateral spout angle,
    whereby the spout is aligned over the subsequent target zone to be filled.

14. The method according to claim 11, wherein the step of aligning the spout over a current target area of the bin requiring the material comprises the step of changing a lateral offset between the receiving vehicle and the transferring vehicle to move the spout from over the current target zone to over the subsequent target zone to be filled.

15. The method according to claim 14, wherein the step of changing a lateral offset between the receiving vehicle and the transferring vehicle comprises the step of:
    establishing a current lateral offset between the receiving vehicle and the transferring vehicle;
    converting the pre-established set of coordinates between the current target zone and the subsequent target zone to be filled into a change in the current lateral offset to form a new lateral offset;
    transmitting the new lateral offset to a steering controller of the transferring vehicle; and
    steering the transferring vehicle to create the new lateral offset between the receiving vehicle and the transferring vehicle,
    whereby the spout is aligned the over the subsequent target zone to be filled.

16. The method according to claim 11, wherein the step of aligning the spout over a current target area of the bin requiring the material comprises the step of changing a fore/aft offset between the receiving vehicle and the transferring vehicle to move the spout from over the current target zone to over the subsequent target zone to be filled.

17. The method according to claim 16, wherein the step of changing a fore/aft offset between the receiving vehicle and the transferring vehicle comprises the step of:
  establishing an initial fore/aft offset between the receiving vehicle and the transferring vehicle;
  converting the pre-established set of coordinates between the current target zone and the subsequent target zone to be filled into a change in the current fore/aft offset to form a new fore/aft offset;
  transmitting the new fore/aft offset to a propulsion controller of the transferring vehicle, or a braking controller of the transferring vehicle; and
  accelerating or braking the transferring vehicle to create the new fore/aft offset between the receiving vehicle and the transferring vehicle,
  whereby the spout is aligned the over the subsequent target zone to be filled.

18. The method according to claim 1, wherein the step of transferring the material from the transferring vehicle to the current target area of the bin of the receiving vehicle comprises the step of actuating an auger.

19. The method according to claim 18, wherein the step of terminating the transfer of the material from the transferring vehicle to the receiving vehicle comprises the step of stopping the auger.

20. The method according to claim 1, wherein the step of transferring the material from the transferring vehicle to the current target area of the bin of the receiving vehicle comprises the step of actuating the spout.

21. The method according to claim 20, wherein the step of terminating the transfer of the material from the transferring vehicle to the receiving vehicle comprises the step of stopping the spout.

22. The method according to claim 1, wherein the step of detecting when the current target area of the bin is filled with the material comprises the step of detecting a representation of the fill level or volumetric distribution of the material in the current target zone of the bin.

23. The method according to claim 22, wherein the step of detecting a representation of the fill level or volumetric distribution of the material in the current target zone of the bin further comprises the steps of:
  receiving data from a distributed fill state sensor; and
  generating the representation of the fill level or volumetric distribution of the material in the current target zone of the bin based on the distributed fill state sensor data.

24. The method according to claim 22, wherein the step of detecting a representation of the fill level or volumetric distribution of the material in the current target zone of the bin further comprises the steps of:
  receiving rectified image data from the at least one imaging device;
  generating disparity image data based on the rectified image data; and
  generating the representation of the fill level or volumetric distribution of the material in the bin using range data based on the disparity image data.

25. The method according to claim 24, wherein the step of receiving rectified image data from the at least one imaging device further comprises receiving a rectified image data from an imaging device on the transferring vehicle, wherein there are no imaging devices on the receiving vehicle.

26. The method according to claim 24, wherein the step of receiving rectified image data from the at least one imaging device further comprises:
  receiving a first rectified image data from a first imaging device on the transferring vehicle; and
  receiving a second rectified image data from a second imaging device on the transferring vehicle,
  wherein there are no imaging devices on the receiving vehicle.

* * * * *